United States Patent
Yanagisawa

(10) Patent No.: US 10,122,930 B2
(45) Date of Patent: Nov. 6, 2018

(54) DISPLAY CONTROL APPARATUS AND CONTROL METHOD THEREOF

(71) Applicant: CANON KABUSHIKI KAISHA, Tokyo (JP)

(72) Inventor: Takuma Yanagisawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/419,099

(22) Filed: Jan. 30, 2017

(65) Prior Publication Data

US 2017/0223275 A1 Aug. 3, 2017

(30) Foreign Application Priority Data

Feb. 3, 2016 (JP) ................................. 2016-019247

(51) Int. Cl.
*H04N 5/232* (2006.01)
*G03B 13/00* (2006.01)

(52) U.S. Cl.
CPC ..... *H04N 5/23293* (2013.01); *H04N 5/23212* (2013.01); *H04N 5/23216* (2013.01)

(58) Field of Classification Search
CPC ........... H04N 5/23293; H04N 1/00408; G03B 13/00; G03B 13/02; G03B 13/04; G03B 13/16; G03B 13/24; G03B 3/00; G03B 2213/02
USPC .......... 348/345–346, 333.01–333.04, 333.09
See application file for complete search history.

(56) References Cited

U.S. PATENT DOCUMENTS

| 8,648,931 B2* | 2/2014 | Chuang | H04N 1/00307 348/222.1 |
| 2011/0032202 A1* | 2/2011 | Aoyagi | G06F 1/1626 345/173 |
| 2011/0193984 A1* | 8/2011 | Kitaya | G06T 1/00 348/222.1 |
| 2012/0146929 A1* | 6/2012 | Oyama | G06F 3/0416 345/173 |
| 2014/0184868 A1* | 7/2014 | Takahashi | H04N 5/23222 348/333.01 |
| 2014/0240577 A1* | 8/2014 | Masugi | H04N 5/23216 348/333.05 |
| 2014/0368719 A1* | 12/2014 | Kaneko | H04N 5/23216 348/333.02 |

FOREIGN PATENT DOCUMENTS

| JP | H05-308552 A | 11/1993 |
| JP | 2005-140943 A | 6/2005 |

* cited by examiner

*Primary Examiner* — Kelly L Jerabek
(74) *Attorney, Agent, or Firm* — Carter, DeLuca, Farrell & Schmidt, LLP

(57) ABSTRACT

A display control apparatus acquires focusing state information indicating a focusing state of a specific region having a different height-width proportion in a captured image, performs control so as to display, together with the captured image, a first display element indicating the specific region and a second display element indicating the focusing state on a display unit, detects an attitude of the display control apparatus, and performs control so as to rotate and display the second display element without rotating the first display element if the attitude of the display control apparatus has been changed from a first attitude to a second attitude by 90 degrees.

20 Claims, 13 Drawing Sheets

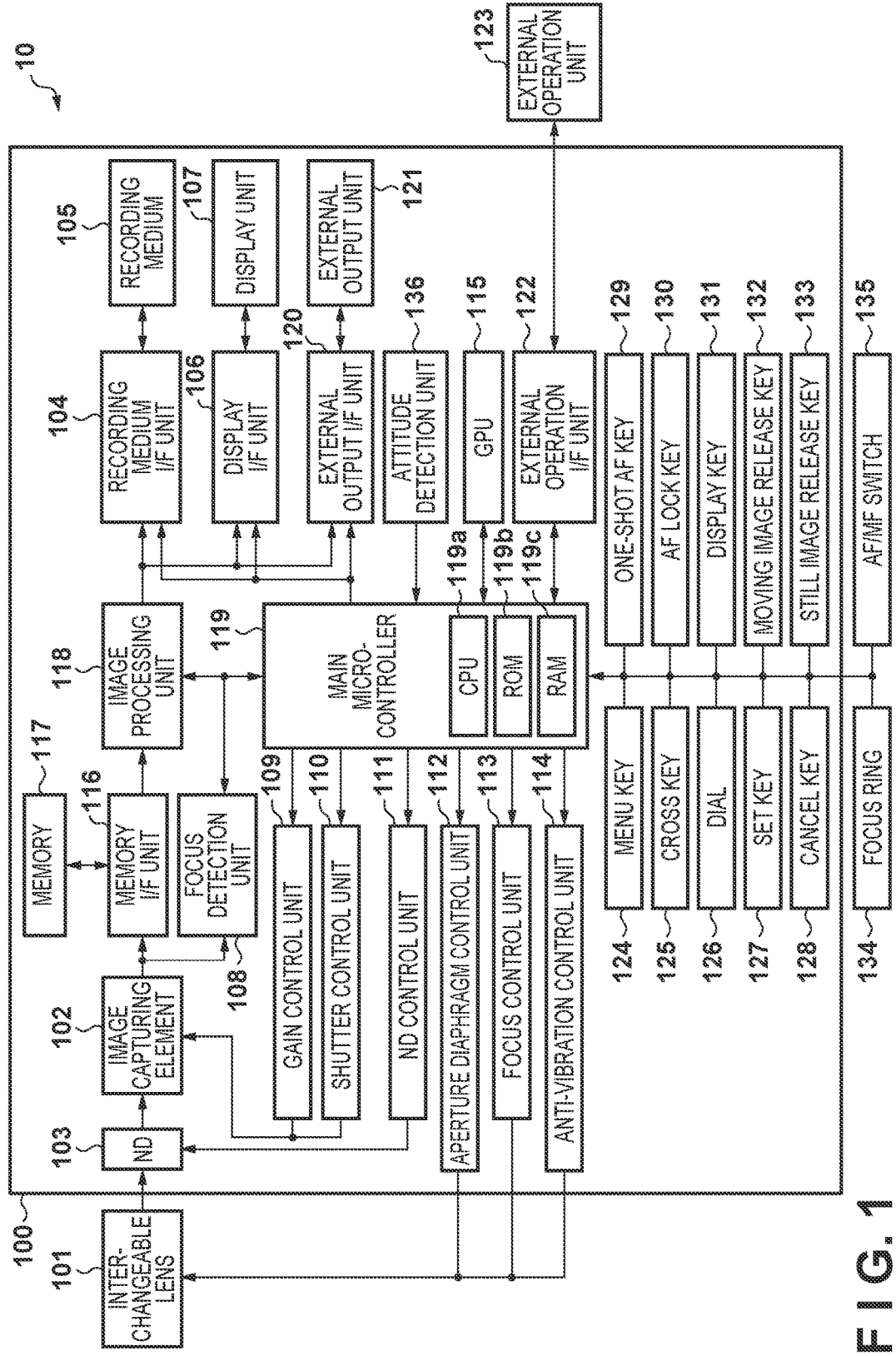
F I G. 1

FIG. 2A

PIXEL CONFIGURATION FOR NON-IMAGE PLANE PHASE DIFFERENCE DETECTION

| R | Gr | R | Gr | R | Gr | R | Gr | R | Gr |
|---|---|---|---|---|---|---|---|---|---|
| Gb | B | Gb | B | Gb | B | Gb | B | Gb | B |

FIG. 2B

PIXEL CONFIGURATION FOR IMAGE PLANE PHASE DIFFERENCE DETECTION

| R A | R B | Gr A | Gr B | R A | R B | Gr A | Gr B | R A | R B | Gr A | Gr B | R A | R B | Gr A | Gr B | R A | R B | Gr A | Gr B |
|---|---|---|---|---|---|---|---|---|---|---|---|---|---|---|---|---|---|---|---|
| Gb A | Gb B | B A | B B | Gb A | Gb B | B A | B B | Gb A | Gb B | B A | B B | Gb A | Gb B | B A | B B | Gb A | Gb B | B A | B B |

DISPLAY CONTROL APPARATUS AND CONTROL METHOD THEREOF

BACKGROUND OF THE INVENTION

Field of the Invention

The present invention relates to a display control apparatus and a control method thereof, particularly relates to a focus guide display control technique for allowing a user to perform focus adjustment.

Description of the Related Art

A display control apparatus for shooting moving images and still images such as a digital camera has a focus guide function for a user to easily perform a focus operating when the user manually performs focus adjustment. Examples of the focus guide function include a function of displaying, as a focus index, the direction of rotation of a focus ring serving as a focus operation unit for allowing the user to focus on a desired object (see Japanese Patent Laid-Open No. 5-308552) and a function of displaying, as a focus index, a change in the focusing degree with respect to an object (see Japanese Patent Laid-Open No. 2005-140943). Another example includes a function of setting an arbitrary focal point detection region, displaying a focus frame, and acquiring distance information regarding the distance to an object included in the set focal point detection region.

In recent years, a function of displaying, as a focus guide, a combination of a focus index and a focus frame as described above has also appeared, which allows the user to manually perform focus adjustment in a more accurate and intuitive manner.

The focus guide as described above can be a convenient indication for the user if it is configured such that, for example, when the camera attitude is changed to a vertical position, the focus guide is rotated by 90 degrees according to the camera attitude. However, if the focus frame (focal point detection region) of the focus guide is rotated according to the change in the attitude, the following problems may arise.

To be specific, the focus frame is not changed despite the fact that the camera attitude is changed, and thus if the range of the focal point detection region is changed by changing the orientation of the focus frame, it may not be able to shoot images in which a desired object is in focus. Conversely, if only the focus frame is rotated without changing the focal point detection region, the focus frame indicates a region that is different from the region for which focal point detection is actually performed, which means a correct display is not achieved. In other words, this means that the direction of the focal point detection region and the direction of the focus frame do not coincide with each other in a configuration in which the focal point detection region has a different height-width proportion due to constraints on the pixel configuration in an image sensor, or the like.

SUMMARY OF THE INVENTION

The present invention has been made in consideration of the aforementioned problems, and realizes a display control technique with which it is possible to correctly display a focusing state even when the apparatus attitude is changed, and provide a guide display that allows a user to easily perform focus adjustment.

In order to solve the aforementioned problems, the present invention provides a display control apparatus comprising: an acquiring unit configured to acquire focusing state information indicating a focusing state of a specific region having a different height-width proportion in a captured image obtained by an image capturing unit; a display control unit configured to perform control so as to display, together with the captured image, a first display element indicating the specific region and a second display element indicating the focusing state acquired by the acquiring unit on a display unit; an attitude detecting unit configured to detect an attitude of the display control apparatus; and a control unit configured to perform control so as to rotate and display the second display element without rotating the first display element if the attitude detecting unit detects that the attitude of the display control apparatus has been changed from a first attitude to a second attitude that is different from the first attitude by 90 degrees.

In order to solve the aforementioned problems, the present invention provides a control method of a display control apparatus comprising: acquiring focusing state information indicating a focusing state of a specific region having a different height-width proportion in a captured image obtained by an image capturing unit; performing control so as to display, together with the captured image, a first display element indicating the specific region and a second display element indicating the acquired focusing state on a display unit; and performing control so as to rotate and display the second display element without rotating the first display element in response to an attitude detecting unit detecting that an attitude of the display control apparatus has been changed from a first attitude to a second attitude that is different from the first attitude by 90 degrees.

In order to solve the aforementioned problems, the present invention provides a non-transitory computer-readable storage medium storing a program for causing a computer to function as an acquiring unit, a display control unit and a control unit of a display control apparatus, wherein: the acquiring unit is configured to acquire focusing state information indicating a focusing state of a specific region having a different height-width proportion in a captured image obtained by an image capturing unit; the display control unit is configured to perform control so as to display, together with the captured image, a first display element indicating the specific region and a second display element indicating the focusing state acquired by the acquiring unit on a display unit; the attitude detecting unit is configured to detect an attitude of the display control apparatus; and the control unit is configured to perform control so as to rotate and display the second display element without rotating the first display element if the attitude detecting unit detects that the attitude of the display control apparatus has been changed from a first attitude to a second attitude that is different from the first attitude by 90 degrees.

According to the present invention, it is possible to correctly display a focusing state even when the apparatus attitude is changed, and provide a guide display that allows a user to easily perform focus adjustment.

Further features of the present invention will become apparent from the following description of exemplary embodiments (with reference to the attached drawings).

BRIEF DESCRIPTION OF THE DRAWINGS

FIG. 1 is a configuration block diagram of a digital camera 10.

FIGS. 2A and 2B are diagrams illustrating a light receiving surface of an image capturing element 102.

FIGS. 3A-1 to 3B-2 show a flowchart illustrating shooting mode processing.

FIGS. 9A to 9I show display examples of the focus guide screen when the face detection function is ON.

DESCRIPTION OF THE EMBODIMENTS

Hardware Configuration

Figures 1, 3A:
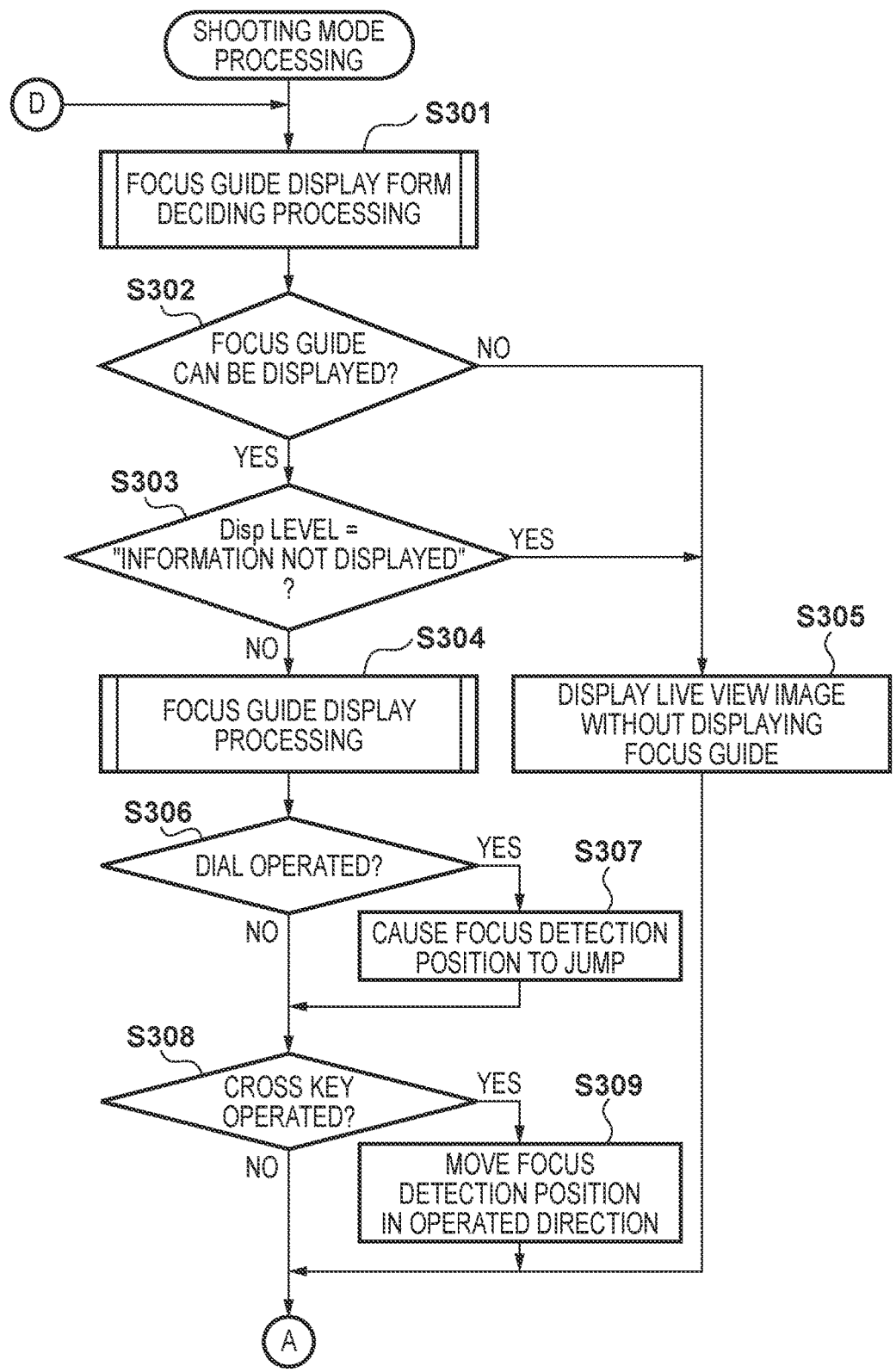

FIG. 1 shows an example of a hardware configuration of a digital camera 10 that is an example of a display control apparatus according to the present invention.

A housing 100 is an outer jacket enclosing many constituent elements of the digital camera 10, and various types of operation units, a display unit 107 and an external output unit 121 are exposed on the surface of the housing 100.

An interchangeable lens 101 is a photographing lens composed of a plurality of lens groups, and is internally provided with a focus lens, a zoom lens and a shift lens, as well as an aperture diaphragm.

Figures 2, 3A:
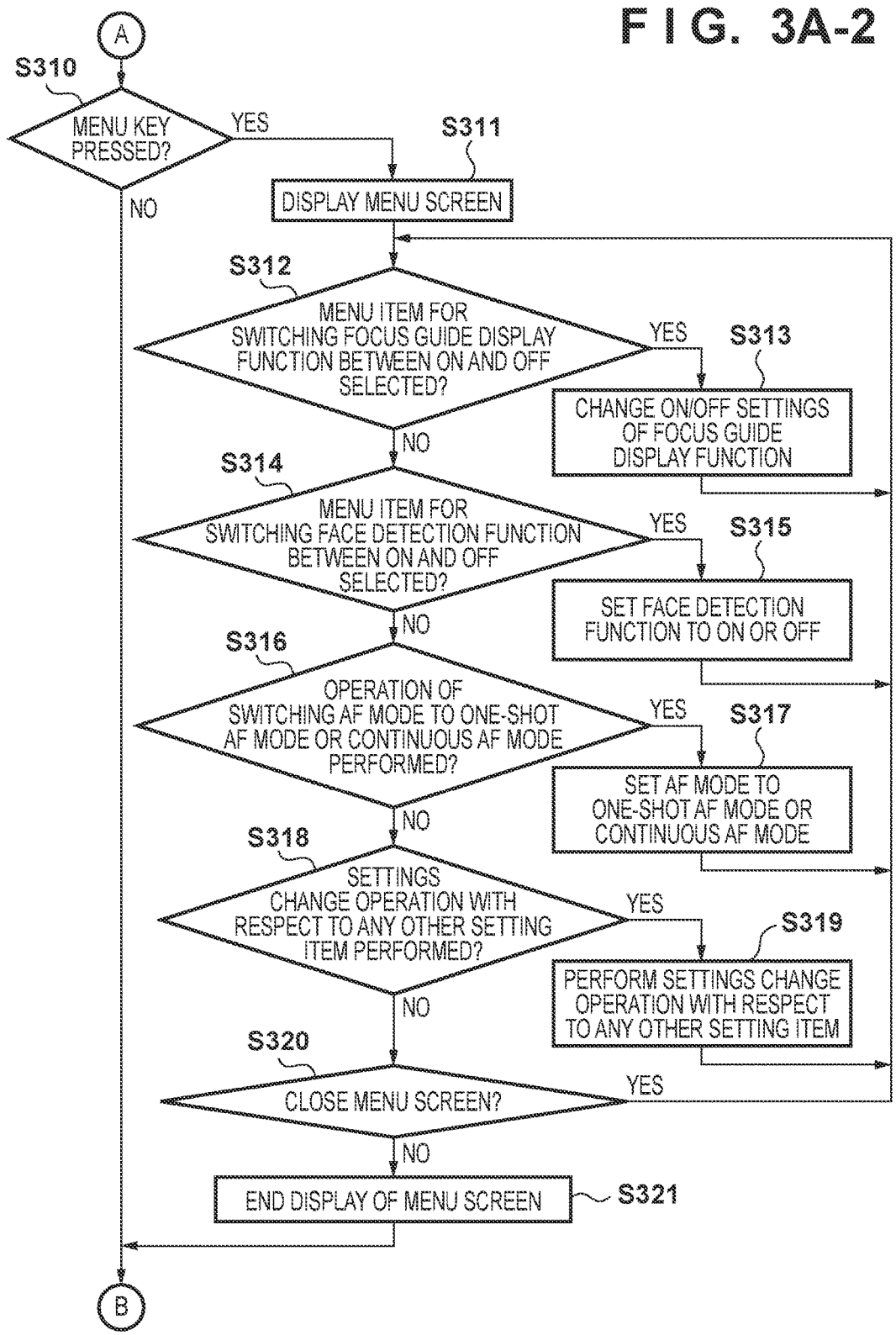

An image capturing element 102 has a configuration in which a plurality of pixels, each including a photoelectric conversion element, are two-dimensionally arranged. In the image capturing element 102, an optical image of an object formed by the interchangeable lens 101 is photoelectrically converted by the pixels, and is further subjected to analog/digital conversion by an A/D converter circuit so as to output an image signal (RAW image data) per pixel. A detailed description of the image capturing element 102 used in the present embodiment and a relevant focus detection unit 108 will be given later with reference to FIGS. 2A and 2B.

An ND filter 103 is provided in the digital camera 10 in order to adjust the amount of incident light, separately from the aperture diaphragm provided in the lens.

An image processing unit 118 corrects a level difference caused by the image capturing element 102. For example, the image processing unit 118 corrects the level of pixels in a valid region by using the pixels in an OB (optical black) region, as well as performing correction on a defective pixel by using the pixels surrounding the defective pixel. The image processing unit 118 also performs various processing operations such as correction of light fall-off at the edge of a frame, color correction, edge enhancement, noise removal, gamma correction, debayering, and compression. After performing the above processing on RAW image data input from the image capturing element 102, the image processing unit 118 outputs corrected image data to a control unit.

Also, the image processing unit 118 detects edge components from the image data by applying horizontal and vertical band-pass filters to the image data. A main microcontroller 119 performs pattern matching with respect to the detected edge components so as to detect an object such as the human face. In the case of face detection, candidate groups for the eyes, the nose, the mouth and the ears are extracted, and the one that satisfies preset conditions (for example, the distance between the eyes, the inclination of the eyes, the color of the eyes, and the like) is singled out from among the extracted candidate groups as a strong candidate. Then, the main microcontroller 119 associates the singled-out candidate group with the corresponding other information (for example, in the case where the candidate is the eyes, other parts of the face other than the eyes such as the nose, the mouth and the ears), and performs filtering by using a preset condition filter so as to extract the face. The user can designate an AF frame (main face frame) on any one of the faces in a live view image displayed on the display unit 107.

A recording medium I/F unit 104 is an interface between a recording medium 105 and the digital camera 10, and is configured to perform control of recording of image data input from the image processing unit 118 into the recording medium 105 and control of reading the recorded image data. The recording medium 105 is a recording medium including a semiconductor memory or the like for recording a shot video or image data, and is configured to record image data and read recorded image data in response to control by the recording medium I/F unit 104. The recording medium 105 is a removable memory card or the like, but may be a built-in recording medium in the camera.

A GPU 115 is a rendering engine that renders various types of information display and menu screens of the digital camera 10 in a VRAM. The GPU 115 has, in addition to a rendering function of rendering character strings and graphics, a scale-up/down rendering function, a rotational rendering function and a layer composition function. The VRAM used for rendering includes an alpha channel that represents a transmittance, and the rendered content can be displayed on a captured image or reproduced image in an on-screen display manner by a display I/F unit 106.

The display I/F unit 106 performs superimposition/composition processing and resize processing on the video data (captured image or reproduced image) from the image processing unit 118 and the display content rendered into the VRAM by the GPU 115, and then outputs (displays) the resultant to (on) the display unit 107. In the case where an enlarged display mode is set, the display I/F unit 106 performs superimposition/composition processing and resize processing on a partial region of the video data. As a result, in the enlarged display mode, an enlarged video larger than that in the normal mode is displayed on the display unit 107, which allows the user to perform focal point adjusting operation (focus operation) during manual focus with higher accuracy.

The display unit 107 can be an external monitor that displays the image data output from the display I/F unit 106 to allow the user to check the angle of view and that can be viewed from the housing 100 side, or a display unit provided within the viewfinder. The display unit 107 may be a liquid crystal display or an organic EL display (organic light-emitting diode display) or the like.

The main microcontroller 119 is a control unit that controls the entire operation of the digital camera 10, and can be a microcomputer or the like. The main microcontroller 119 includes a CPU 119a, a ROM 119b and a RAM 119c. The CPU 119a executes the operations of various types of flowcharts, which will be described later, by extracting a program stored in the ROM 119b into the RAM 119c and executing the program.

A gain control unit 109, a shutter control unit 110, an ND control unit 111 and an aperture diaphragm control unit 112, which will be described below, are functional blocks for exposure control. These units are controlled by the main microcontroller 119 based on a result of calculation of the brightness level of each image data output from the image processing unit 118, the calculation being performed by the main microcontroller 119, or based on operating parameters manually set by the user.

The gain control unit 109 controls the gain of the image capturing element 102. The shutter control unit 110 controls the shutter speed of the image capturing element 102. The ND control unit 111 controls the amount of light incident on the image capturing element 102 via the ND filter 103. The aperture diaphragm control unit 112 controls the aperture diaphragm of the interchangeable lens 101.

A focus control unit 113 performs different operations depending on whether the focus control mode stored in the main microcontroller 119 is set to an autofocus mode (hereinafter also referred to as AF mode) or a manual focus mode (hereinafter also referred to as MF mode).

In the case of the AF mode, the main microcontroller 119 calculates focusing information by referencing to the image data output from the image processing unit 118, and the focus control unit 113 controls the focus lens provided in the interchangeable lens 101 based on the calculated focusing information. Alternatively, the focus control unit 113 controls the focus lens provided in the interchangeable lens 101 based on the amount of defocus output from the focus detection unit 108 by an image plane phase difference detection scheme.

The focus information may be calculated based on only an object within an AF frame set in a partial region of the image data. The AF mode further includes two operation modes depending on the processing executed by the main microcontroller 119. One is a one-shot AF mode in which AF control is performed only when a one-shot AF key 129 is pressed, and the AF control of the focus control unit 113 is terminated after it is determined whether or not focusing is successful. The other mode is a continuous AF mode (servo AF) in which AF control is constantly performed. However, even in the continuous AF mode, the AF control of the focus control unit 113 is terminated when an AF locked state is set by an AF lock key 130 being pressed. These two AF modes described above can be switched by a settings change operation performed on a menu screen.

In the case of the MF mode, the focus control unit 113 terminates AF control. Then, when the user manually rotates a focus ring 134 provided on the interchangeable lens 101, an arbitrary focus adjusting operation can be performed.

An anti-vibration control unit 114 calculates motion vectors of an object by using the main microcontroller 119 by referencing to the image data output from the image processing unit 118, and performs optical anti-vibration processing for controlling the shift lens included in the interchangeable lens 101 so as to compensate for camera shake by hands based on the calculated motion vectors. Alternatively, the anti-vibration control unit 114 performs electronic anti-vibration processing for cutting out an image in each frame of a moving image in a direction in which image blur caused by camera shake by hands is compensated.

A memory I/F (interface) unit 116 writes, into a memory 117, all pixels' worth of RAW image data output from the image capturing element 102, and reads out the RAW image data stored in the memory 117 so as to output the read RAW image data to the image processing unit 118.

The memory 117 is a volatile storage medium having a capacity capable of storing all pixels' worth of RAW image data of several frames.

The image processing unit 118 performs image processing necessary to perform control on all pixels' worth of RAW image data transmitted from the memory I/F unit 116.

An external output I/F unit 120 performs resize processing on the video data generated by the image processing unit 118. Also, the external output I/F unit 120 performs signal conversion to obtain a signal that conforms to the specification of the external output unit 121 as well as application of a control signal, and outputs the resultant to the external output unit 121.

The external output unit 121 is a terminal that externally outputs video data, and can be, for example, a SDI (serial digital interface) terminal or a HDMI® (high-definition multimedia interface) terminal. The external output unit 121 can be connected to external devices such as a monitor display and an external recording apparatus.

An external operation I/F unit 122 is a functional module that receives a control instruction from an external operation unit 123 and notifies the main microcontroller 119 of the control instruction, and can be, for example, an infrared remote control light-receiving unit, a wireless LAN (local area network) interface or LANC® (local application control bus system).

The external operation unit 123 transmits a control instruction (control command) to the external operation I/F unit 122. The external operation unit 123 is capable of transmitting instructions (commands) corresponding to the operations of operation units 124 to 135 included in the housing 100 and the interchangeable lens 101, as well as transmitting settings change information on the menu screen displayed on the display unit 107.

The operation units 124 to 135 are operation members such as a key (button), a dial, a tactile switch and a ring. Also, the operation units 124 to 135 include a touch panel that can detect a touch on the display unit 107. These operation units have a function of accepting a user operation and notifying the main microcontroller 119 of a control instruction. The main microcontroller 119 determines whether or not a touch operation has been performed on the touch panel, and calculates the coordinates of the touch position. The menu key 124 to the DISPLAY key 131 are main body-side operation units provided on the housing 100. The focus ring 134 and the AF/MF switch 135 are lens-side operation units provided on the interchangeable lens 101. Some of the operation units may exchange their key functions or may have other functions assigned thereto depending on the change in the settings on the menu screen.

The menu key 124 provides an instruction to display a menu screen on the display unit 107 or an instruction to close the menu screen already displayed on the display unit 107.

The cross key 125 and the dial 126 both provide an instruction to move a cursor for selecting an item on the menu screen, or an instruction to move the display position of a focus frame in a direction designated by the user. The cross key 125 is a directional pad composed of an up key, a down key, a left key and a right key, which may be separate operation members or may be configured as a single operation member such that an instruction to move in any one of up, down, right and left directions can be provided depending on the pressed position. The dial 126 is a rotational operation member that can be turned clockwise and counterclockwise.

The SET key 127 is used to select an item pointed to by the cursor on the menu screen or provide an instruction to enter any setting operation.

The cancel key 128 is used to provide an instruction to move back to the immediately preceding hierarchy level while a deep hierarchy level is selected on the menu screen or an instruction to discard any setting operation.

The one-shot AF key 129 is used to provide an instruction to cause the focus control unit 113 to execute an AF operation when the AF mode is set to the one-shot AF.

The AF lock key 130 is used to provide a termination instruction to terminate the AF control performed by the focus control unit 113 when the AF mode is set to the continuous AF mode, and a release instruction to release the terminated state.

The moving image release key 132 is used to provide an instruction to start recording of a moving image by the recording medium I/F unit 104 and an instruction to terminate the recording.

The still image release key 133 is a pressing key having two stages such as a half pressed state and a fully pressed state. If the still image release key 133 is half pressed, the main microcontroller 119 performs AF control, exposure control and the like as a recording preparation operation for still images. If the still image release key 133 is fully pressed, the main microcontroller 119 performs a series of processing operations including exposure processing, development processing, and recording processing by the recording medium I/F unit 104.

The DISPLAY key 131 is used to provide an instruction to change the setting of Disp level stored in the main microcontroller 119. The user can select the Disp level so as to limit various types of information displayed on the display unit 107, display more detailed information, or more clearly display the video.

The focus ring 134 allows the user to manually move the focus lens in the interchangeable lens 101 to perform a focal point adjusting operation when the focus control mode is set to the MF mode.

The AF/MF switch 135 is used to provide an instruction to switch the focus control mode between the AF mode and the MF mode.

The attitude detection unit 136 is an acceleration sensor, a gyro sensor or the like that detects attitude information (the angle of rotation and the direction of rotation) of the digital camera 10 with respect to the direction of gravity. The main microcontroller 119 can determine, based on the attitude information detected by the attitude detection unit 136, which of the following positions the digital camera 10 is in: normal position (the attitude information indicates +0 degrees, horizontal position); +90 degree position (rotated 90 degrees to the right (clockwise direction), vertical position); −90 degree position (rotated 90 degrees to the left (counterclockwise direction), vertical position); +180 degree position; and −180 degree position (rotated 180 degrees to the right or left, horizontal position).

Image Plane Phase Difference Detection

FIGS. 2A and 2B show a part of the light receiving surface of the image capturing element 102 serving as an image sensor.

The image capturing element 102 includes, in order to enable image plane phase difference AF, pixel portions that are arranged in an array, each pixel portion including one micro-lens and two photodiodes, which are light receiving portions serving as photoelectric conversion units. With this configuration, each pixel portion can receive bundles of rays that have undergone division of the exit pupil of the interchangeable lens 101.

FIG. 2A is a schematic diagram showing a part of the surface of an image sensor having a Bayer arrangement of a red (R) pixel, a blue (B) pixel and green pixels (Gb, Gr), which is shown as a reference. FIG. 2B shows pixel portions, each including one micro-lens and two photodiodes serving as photoelectric conversion units, which are shown so as to correspond to the color filter arrangement shown in FIG. 2A.

The image sensor having the above configuration is configured so as to be capable of outputting two phase difference detection signals (hereinafter also referred to as image signal A and image signal B) from each pixel portion. Also, the image sensor is capable of outputting a captured image recording signal (the image signal A+the image signal B) obtained by adding the signals of two photodiodes. In the case of the signal obtained by adding the signals, a signal that is equivalent to the output of the image sensor having a Bayer arrangement briefly described with reference to FIG. 2A is output.

The focus detection unit 108 performs correlation calculation of two image signals by using the output signal from the image capturing element 102, serving as an image sensor as described above, so as to calculate various types of information such as the amount of defocus and reliability. The amount of defocus refers to the amount of defocus on the image plane calculated based on a deviation between the image signal A and the image signal B. The amount of defocus has positive and negative values, and it is possible to determine whether the state is a front-focused state or a rear-focused state depending on whether the amount of defocus has a positive value or a negative value. It is also possible to determine a focusing degree by using the absolute value of the amount of defocus. If the amount of defocus is 0, it is determined that the focusing state is an in-focus state. That is, the focus detection unit 108 outputs, to the CPU 119a of the main microcontroller 119 and the like, information indicating that the state is a front-focused state or a rear-focused state obtained based on whether the amount of defocus calculated with respect to a focus detection position (focus detection region, focal point detection position and focal point detection region) takes a positive value or a negative value. Also, the focus detection unit 108 outputs, to the CPU 119a and the like, information (information indicating an in-focus state) indicating the focusing degree (the degree of out-of-focus) obtained based on the absolute value of the amount of defocus. Also, the focus detection unit 108 outputs the information indicating that the state is a front-focused state or a rear-focused state if it is determined that the amount of defocus exceeds a predetermined value, and outputs the information indicating that the state is an in-focus state if it is determined that the absolute value of the amount of defocus is less than or equal to a predetermined value. The focusing degree information is output as a value obtained by converting the amount of defocus to the amount of operation required to rotate the focus ring 134 until an in-focus state is achieved.

The image capturing element 102 according to the present embodiment outputs a total of three signals: an image capturing signal and two phase difference detection signals, but the configuration is not limited thereto. For example, the image capturing element 102 may be configured to output a total of two signals: an image capturing signal and one of a pair of phase difference detection image signals. In this case, the other one of the pair of phase difference detection image signals is calculated by using two output signals from the image capturing element 102 after output.

Also, in the example shown in FIGS. 2A and 2B, pixel portions, each including one micro-lens and two photodiodes serving as photoelectric conversion units, are arranged in an array, but a configuration is also possible in which pixel portions, each including one micro-lens and three or more photodiodes serving as photoelectric conversion units, are arranged in an array. Also, a plurality of pixel portions may be provided, each pixel portion having a different opening position of a light-receiving portion with respect to the micro-lens. That is, it is sufficient if it is possible to, as a consequence, acquire two phase difference detection signals capable of phase difference detection such as an image signal A and an image signal B.

Figure 6:
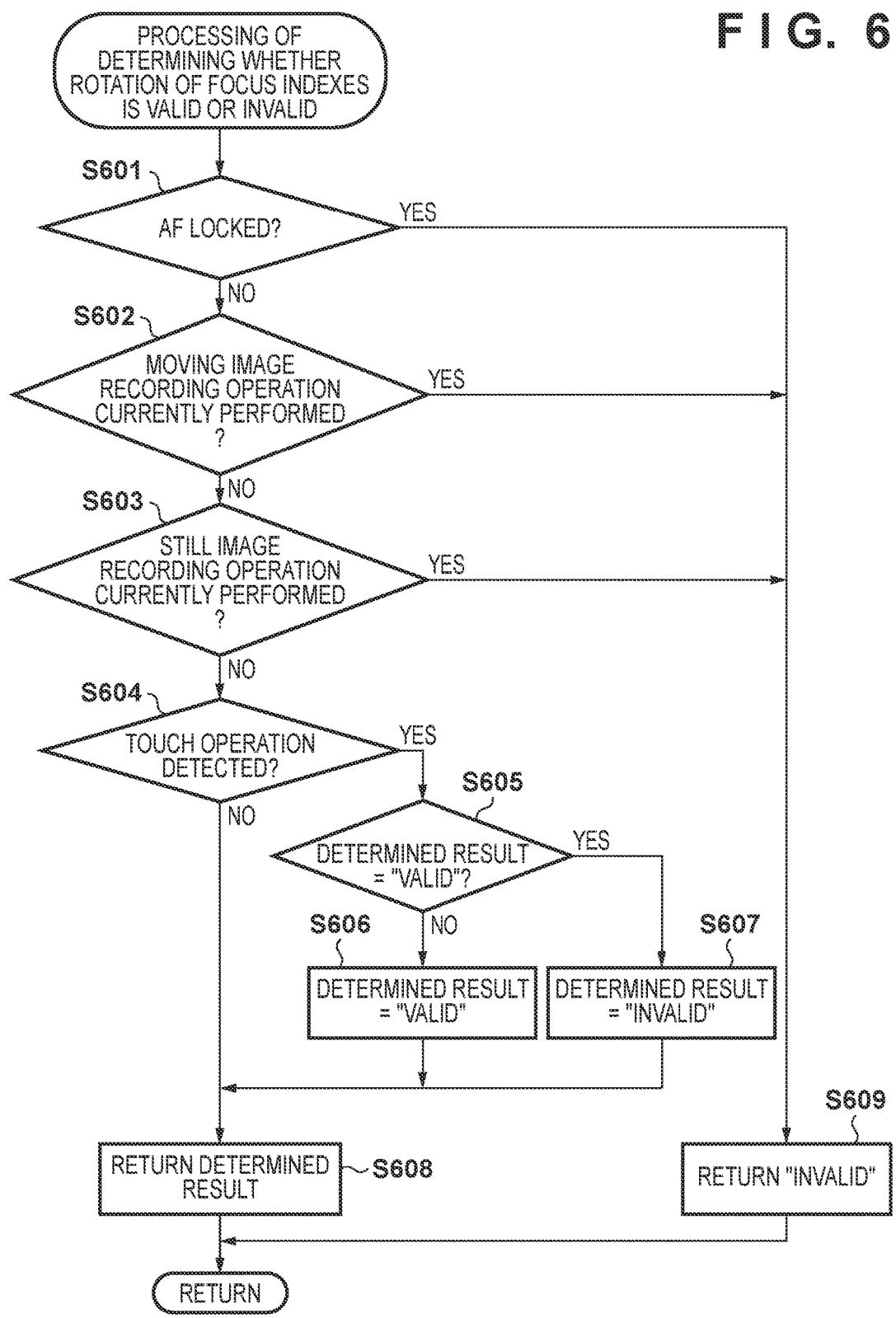
FIG. 6 is a flowchart illustrating the processing of determining whether the rotation of focus indexes is valid or invalid.

FIGS. 3A-1 to 6 are flowcharts illustrating various types of control processing performed by the digital camera 10. The operations of the flowcharts are implemented by the main microcontroller 119 (to be specific, the CPU 119a) extracting a program stored in the ROM 119b into the RAM 119c and the CPU 119a controlling the constituent elements of the digital camera 10 based on the program.

Shooting Mode Processing

First, shooting mode processing performed by the digital camera 10 according to the present embodiment will be described with reference to the flowchart shown in FIGS. 3A-1 to 3B-2. The processing shown in FIGS. 3A-1 to 3B-2 starts when the digital camera 10 is activated and set in a shooting mode.

In S301, the CPU 119a decides the display form of a focus guide that is output to the display unit 107. The focus guide display form is decided based on information such as whether a face detection function is ON or OFF, whether the focus control mode is set to the AF mode or the MF mode, the attitude of the digital camera 10, and whether a focus guide display function is ON or OFF. This processing will be described later in detail with reference to FIGS. 5A, 5B and 6.

In S302, the CPU 119a determines whether or not the display form decided in S301 is a form capable of displaying a focus guide. To be more specific, it is determined whether or not "focus guide: displayed" is obtained as a result of processing shown in FIGS. 5A and 5B, which will be described later. If it is determined that the display form is a form capable of displaying a focus guide, the procedure proceeds to S303. Otherwise, the procedure proceeds to S305.

In S303, the CPU 119a determines whether or not the setting of Disp level has been set to "information not displayed". As used herein, the Disp level refers to the level of display of information having a plurality of stages in which different settings are made with respect to how much detail of various types of information superimposed on the captured image should be displayed and what kind of information should be displayed. If it is determined that the Disp level has been set to "information not displayed", no information is displayed on the captured image. The setting of Disp level will be described later in S334. If it is determined that the Disp level has been set to "information not displayed", the procedure proceeds to S305. If it is determined that the Disp level has been set to a level other than "information not displayed", the procedure proceeds to S304.

In S304, the CPU 119a performs focus guide display processing. This processing is processing for displaying, with respect to an object located in a specific position (focus detection position, focal point detection position) in the captured image, a focus guide including display elements that indicate the focusing degree and an operational direction required to achieve an in-focus state based on the information acquired by the focus detection unit 108. The processing will be described later in detail with reference to FIG. 4.

In S305, the CPU 119a displays a live view image on the display unit 107 without displaying a focus guide. As used herein, the live view image is an image that has been captured by the image capturing element 102 and undergone live view image processing performed by the image processing unit 118, the live view image being successively updated at a predetermined frame rate.

In S306, the CPU 119a determines whether or not the dial 126 has been operated (whether or not an instruction to move has been received). If it is determined that the dial 126 has been operated, the procedure proceeds to S307. Otherwise, the procedure proceeds to S308.

In S307, the CPU 119a causes the focus detection position (focus detection region, focal point detection position, focal point detection region) to jump (move) to any one of a plurality of specific positions according to the operation of the dial 126. For example, the CPU 119a causes the focus detection position to jump from one of four intersection points of a golden ratio (approximately 5:8) grid that is closest to the immediately preceding focus detection position to a subsequent intersection point corresponding to the direction of rotation of the dial 126 (changes the focus detection position), the golden ratio grid being obtained by horizontally and vertically dividing the video. Also, the CPU 119a updates the focus detection position stored in the RAM 119c by the moved focus detection position. As a result of the focus detection position being moved, the display position of the focus guide is also moved in conjunction with the focus detection position. In general, it is said that the composition is stabilized by disposing a main object at one of the intersection points of the golden ratio grid in the video. For this reason, in the case where image shooting is performed in consideration of the golden ratio grid, it is highly likely that an object for which focus adjustment needs to be performed is disposed at one of the four intersection points described above. As described above, with the configuration in which the focus detection position is sequentially jumped to one of the intersection points of the golden ratio grid according to the operation of the dial 126, it is possible to quickly change the focus detection position to the position of an object for which focus adjustment needs to be performed, the object being disposed at one of the intersection points of the golden ratio grid. The processing of S306 and S307 is performed only when a setting is made to display auxiliary lines (grid lines) at the golden ratio. Otherwise, image shooting may not be image shooting in consideration of the golden ratio grid, and thus a configuration may be used that prevents the focus detection position from jumping even when the dial 126 is operated. Also, the focus detection position does not need to be jumped to one of the intersection points of the golden ratio grid, and may be jumped to one of the intersection points of a 3×3 grid, the center of the screen, or the like. Furthermore, the focus detection position may be jumped to a different position according to the type of grid lines displayed. For example, if grid lines of the golden ratio grid are displayed, the focus detection position is sequentially moved to one of the intersection points of the golden ratio grid according to the operation of the dial 126 as described above. If, on the other hand, grid lines of a 3×3 grid are displayed, the focus detection position is sequentially moved to one of the intersection points of the 3×3 grid according to the operation of the dial 126.

In S308, the CPU 119a determines whether or not the cross key 125 has been operated (whether or not an instruction to move has been received). If it is determined that the cross key 125 has been operated, the procedure proceeds to S309. Otherwise, the procedure proceeds to S310.

In S309, the CPU 119a moves the focus detection position by a fixed amount in a direction corresponding to one of the keys of the cross key 125 that has been operated (in any one of up, down, right and left directions). Also, the CPU 119a updates the focus detection position stored in the RAM 119c by the moved focus detection position. As a result of the focus detection position being moved, the display position of the focus guide is also moved in conjunction with the focus detection position. A configuration is possible in which if the cross key 125 is continuously operated (continuously pressed for a predetermined length of time or more), the moving speed of the focus detection position is increased according to the operation time. With this configuration, the focus detection position can be quickly moved to an object located at a position distant from the focus detection position before it is moved. The operation of moving the focus detection position according to the operation of the dial 126 is an operation for moving the focus detection position by causing the focus detection position to jump to any one of a plurality of predetermined positions, whereas the operation of moving the focus detection position according to the operation of the cross key 125 is an operation for moving the focus detection position to an arbitrary position on the screen. A configuration is also possible in which, if face detection control is performed by the image processing unit 118, the focus detection position is moved to the position of a detected face that is present in the operational direction in which the cross key 125 was operated. With this configuration, the focus detection position can also be immediately moved to a face located at a distant position.

As described in steps S306 to S309, the focus detection position can be moved according to the user operation only when the face detection function, which will be described later in S314, is OFF. When the face detection function is ON, the focus detection position is automatically moved to the position of a face determined as the main face among detected faces. For this reason, when the face detection function is ON, the focus detection position is not moved even if the dial 126 or the cross key 125 is operated by the user.

In S310, the CPU 119a determines whether or not the menu key 124 has been pressed. If it is determined that the menu key 124 has been pressed, the procedure proceeds to S311. Otherwise, the procedure proceeds to S322 shown in FIG. 3B-1.

In S311, the CPU 119a displays, on the display unit 107, a menu screen in which setting items (menu items) regarding the digital camera 10 are listed. In the menu screen, the settings of various types of functions of the digital camera 10 can be changed by selecting any one of the menu items by using the cross key 125 or the dial 126 and performing a selection operation or an enter operation by using the SET key 127.

In S312, the CPU 119a determines whether or not an operation of selecting a menu item for switching the focus guide display function between ON and OFF and then switching the focus guide display function between ON and OFF from the selected item has been performed. If it is determined that the operation of switching the focus guide display function between ON and OFF has been performed, the procedure proceeds to S313. Otherwise, the procedure proceeds to S314.

In S313, the CPU 119a changes the ON/OFF settings of the focus guide display function. If the focus guide display function is set to ON, information indicating that the focus guide display function is set to ON is stored in the ROM 119b. If the focus guide display function is set to OFF, information indicating that the focus guide display function is set to OFF is stored in the ROM 119b. Once the focus guide display function is set to OFF from the menu item as described above, the focus guide is not displayed in any situation. On the other hand, even if the focus guide display function is set to ON from the menu item, the focus guide is not necessarily displayed constantly, but is displayed according to the situation based on a condition in which the focus control mode has been set to the AF mode or the MF mode, or various types of conditions such as Disp level.

In S314, the CPU 119a determines whether or not an operation of selecting a menu item for switching the face detection function between ON and OFF and then switching the face detection function between ON and OFF from the selected item has been performed. If it is determined that the operation of switching the face detection function between ON and OFF has been performed, the procedure proceeds to S315. Otherwise, the procedure proceeds to S316.

In S315, the CPU 119a sets the face detection function to ON or OFF based on the operation of switching the face detection function between ON and OFF and stores information indicating the set state in the ROM 119b. If the face detection function is set to ON, a person's face region (specific object region) is detected from the captured live view image (captured image), and a face frame is placed around the detected face region and displayed. Also, in the case where the AF mode has been set, autofocusing (face AF) is performed on a face (main face) determined as the most dominant face in a plurality of detected face regions based on conditions such as whether it is large in size, it is located near the center of the screen, or it has been authenticated as a specific person that is registered in advance. If the face detection function is set to ON and a face is successfully detected, the focus detection position is overwritten by the position of the main face region. That is, the focus guide display position, which will be described later, is linked with the position of the detected main face (main face frame).

In S316, the CPU 119a determines whether or not a menu item for changing the settings of the AF mode has been selected and an operation of changing the AF mode has been performed. If it is determined that the operation of changing the AF mode has been performed, the procedure proceeds to S317. Otherwise, the procedure proceeds to S318. In the present embodiment, it is assumed that the AF mode includes two AF modes: one-shot AF mode and continuous AF mode. The one-shot AF mode is an operation mode in which one instance of AF operation is performed in response to the user pressing the one-shot AF key 129 one time, but otherwise the focus position is not moved. An AF operation is performed each time the one-shot AF key 129 is pressed. On the other hand, the continuous AF mode is an operation mode in which an AF operation is continuously performed on a predetermined object so as to bring the object into focus. Even if the user does not perform any operation, the focus position is adjusted as appropriate in response to a movement of the object that needs to be brought into focus or in response to a movement of the digital camera 10. The present embodiment has been described using, as an example, two AF modes as the AF mode, but the present invention is not limited thereto, and may be configured such that any other AF modes can be selected.

In S317, the CPU 119a sets the AF mode (either the one-shot AF mode or the continuous AF mode in the present embodiment) selected by the user in response to the operation of changing the AF mode, and stores information indicating the set AF mode in the ROM 119b.

In S318, the CPU 119a determines whether or not, on the menu screen, a settings change operation has been performed on a setting item other than the setting items described in S312 to S316 above. If it is determined that a settings change operation has been performed, the procedure proceeds to S319. Otherwise, the procedure proceeds to S320.

In S319, the CPU 119a performs a settings change operation according to the operation performed in S318.

In S320, the CPU 119a determines whether or not an operation to close the menu screen has been performed. As used herein, the operation to close the menu screen refers to any one of the following operations: an operation of pressing the menu key 124; an operation of pressing the cancel key 128 on the initial menu screen; and an operation of pressing the SET key 127 in a state in which an item for ending the display of the menu screen has been selected. If it is determined that the operation to close the menu screen has been performed, the procedure proceeds to S321. Otherwise, the procedure returns to S312, and the processing is repeated.

Figures 1, 3B:
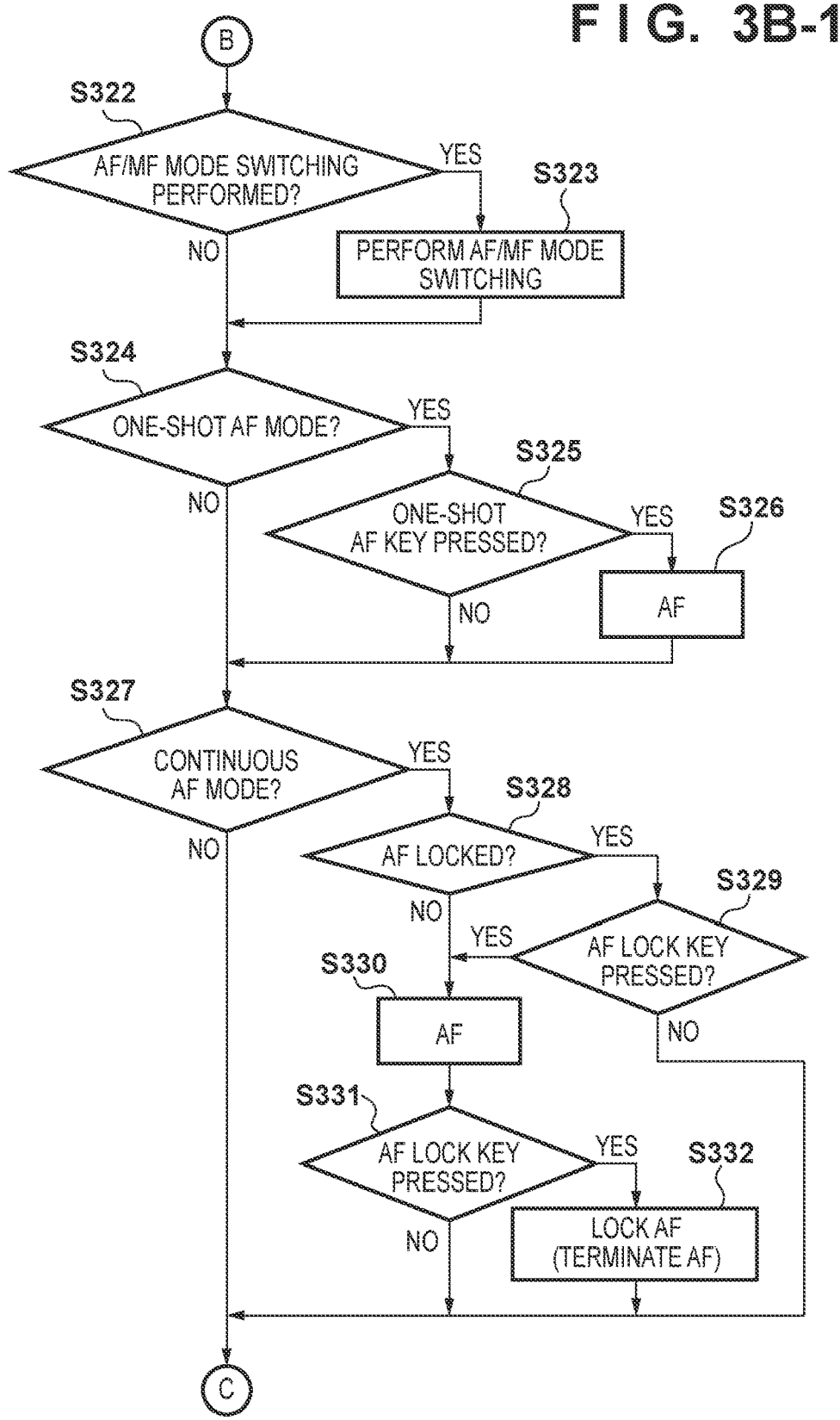
Figures 2, 3B:
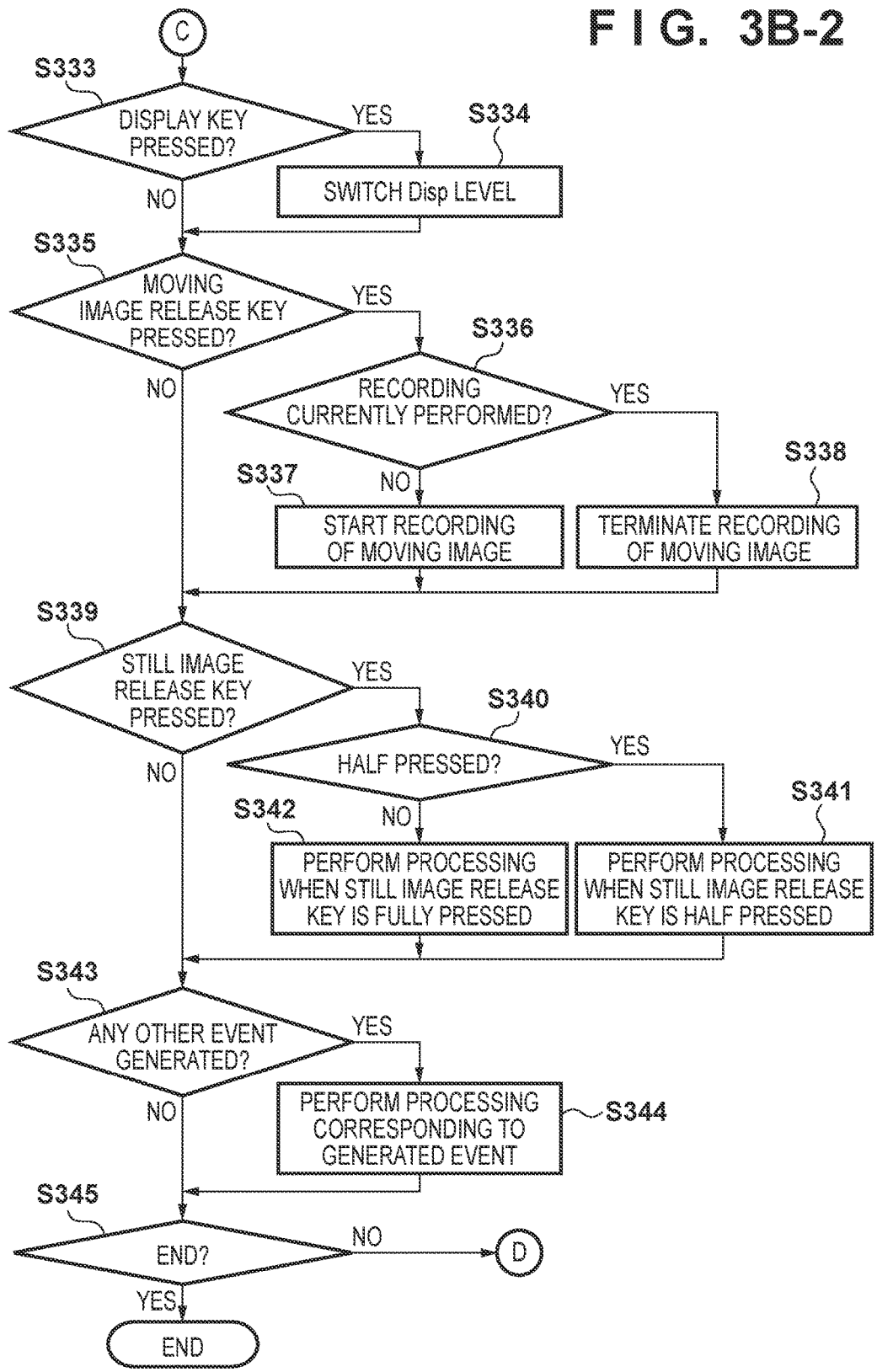

In S321, the CPU 119a ends the display of the menu screen and re-displays the live view image, and then the procedure proceeds to S322 shown in FIG. 3B-1.

In S322 shown in FIG. 3B-1, the CPU 119a determines whether or not an operation to switch between the AF mode and the MF mode has been performed by the AF/MF switch 135. If it is determined that an operation to switch between the AF mode and the MF mode has been performed, the procedure proceeds to S323. Otherwise, the procedure proceeds to S324.

In S323, the CPU 119a performs switching between the AF mode and the MF mode according to the operation of the AF/MF switch 135. If the focus control mode is switched to the AF mode, information indicating that the focus control mode has been switched to the AF mode is stored in the ROM 119b, and AF control is started. Also, if the focus control mode is switched to the AF mode, AF control is performed in one of the one-shot AF mode and the continuous AF mode described above that is indicated by the current AF mode.

In S324, the CPU 119a determines whether or not the AF mode has been set by the AF/MF switch 135 and the AF mode is set to the one-shot AF mode. If it is determined that the AF mode is set to the one-shot AF mode, the procedure proceeds to S325. Otherwise, the procedure proceeds to S327.

In S325, the CPU 119a determines whether or not the one-shot AF key 129 has been pressed (whether or not an instruction to execute AF has been received). If it is determined that the one-shot AF key 129 has been pressed, the procedure proceeds to S326. Otherwise, the procedure proceeds to S327.

In S326, the CPU 119a performs AF by controlling the focus control unit 113 so as to bring the object at the focus detection position corresponding to the AF frame into focus.

In S327, the CPU 119a determines whether or not the AF mode has been set by the AF/MF switch 135 and the AF mode is set to the continuous AF mode. If it is determined that the AF mode is set to the continuous AF mode, the procedure proceeds to S328. Otherwise, the procedure proceeds to S333.

In S328, the CPU 119a determines whether or not the camera is in an AF locked state as a result of the AF lock key 130 being pressed. If it is determined that the camera is in an AF locked state, the procedure proceeds to S329. Otherwise, the procedure proceeds to S330. As used herein, the AF locked state is a state in which the focus position is fixed by temporarily terminating AF during the continuous AF mode.

In S329, the CPU 119a determines whether or not the AF lock key 130 has been pressed (whether or not an instruction to terminate AF or an instruction to release the termination of AF has been received). If it is determined that the AF lock key 130 has been pressed, the procedure proceeds to S330. Otherwise, the procedure proceeds to S335.

In S330, the CPU 119a releases the AF locked state, and performs continuous AF so as to continuously control the focus control unit 113 to bring the object corresponding to the AF frame into focus.

In S331, the CPU 119a determines whether or not the AF lock key 130 has been pressed. If it is determined that the AF lock key 130 has been pressed, the procedure proceeds to S332. Otherwise, the procedure proceeds to S333.

In S332, the CPU 119a terminates the continuous AF and locks AF (brings the camera into an AF locked state). That is, the AF control performed by the focus control unit 113 is terminated. This prevents AF from changing the focus position, but enables the user to perform manual focus through operation of the focus ring 134.

In S333, the CPU 119a determines whether or not the DISPLAY key 131 has been pressed. If it is determined that the DISPLAY key 131 has been pressed, the procedure proceeds to S336. Otherwise, the procedure proceeds to S335.

In S334, the CPU 119a switches the Disp level in response to the pressing of the DISPLAY key 131, stores the changed Disp level in the ROM 119b, and displays information indicating the changed Disp level.

In S335, the CPU 119a determines whether or not the moving image release key 132 has been pressed. If it is determined that the moving image release key 132 has been pressed, the procedure proceeds to S336. Otherwise, the procedure proceeds to S339.

In S336, the CPU 119a determines whether or not a moving image recording operation is currently performed (whether or not shooting is currently recorded). If it is determined that a recording operation is currently performed, the procedure proceeds to S338. Otherwise (if the camera is currently in a shooting standby state), the procedure proceeds to S337.

In S337, the CPU 119a starts moving image recording. That is, a moving image captured by the image capturing element 102 and processed for recording by the image processing unit 118 is recorded as a moving image file in a predetermined file format in the recording medium 105.

In S338, the CPU 119a terminates the moving image recording. Upon termination of the moving image recording, the CPU 119a performs moving image finishing processing such as assigning attributes to the recorded moving image file and closing the file.

In S339, the CPU 119a determines whether or not the still image release key 133 has been pressed. If it is determined that the still image release key 133 has been pressed, the procedure proceeds to S340. Otherwise, the procedure proceeds to S343.

In S340, the CPU 119a determines whether or not the still image release key 133 has been half pressed. If it is determined that the still image release key 133 has been half pressed, the procedure proceeds to S341. Otherwise, the procedure proceeds to S342.

In S341, the CPU 119a performs AF control, exposure control and the like as a still image recording preparation operation when the still image release key 133 is half-pressed.

In S342, the CPU 119a starts a processing operation when the still image release key 133 is fully pressed. That is, a still image captured by the image capturing element 102 and processed for recording by the image processing unit 118 is recorded as a still image file in a predetermined file format in the recording medium 105. The processing operation when the still image release key 133 is fully pressed may be performed after the completion of the preparation operation when the still image release key 133 is half pressed, or may be performed before the completion of the preparation operation when the still image release key 133 is half pressed. However, the operation when the still image release key 133 is half pressed can be started only after the completion of the operation when the still image release key 133 is fully pressed.

In S343, the CPU 119a determines whether or not an event other than the events in the above-described processing steps has been generated. If it is determined that another event has been generated, the procedure proceeds to S344. Otherwise, the procedure proceeds to S345. In S344, the CPU 119a performs processing corresponding to the event generated in S343.

In S345, the CPU 119a determines whether or not an event to end the shooting mode processing has been generated. If it is determined that an end event has been generated, the shooting mode is ended. Otherwise, the procedure returns to S301, and the processing is repeated. The end event can be, for example, an operation to power off the digital camera 10, power-off caused by a reduction in the power supply voltage, auto power-off in response to no operation being performed for a predetermined length of time in the shooting standby state, an operation to transition to an operation mode other than the shooting mode such as a reproduction mode or a communication mode, or the like.

Focus Guide Display Processing

Figure 4:
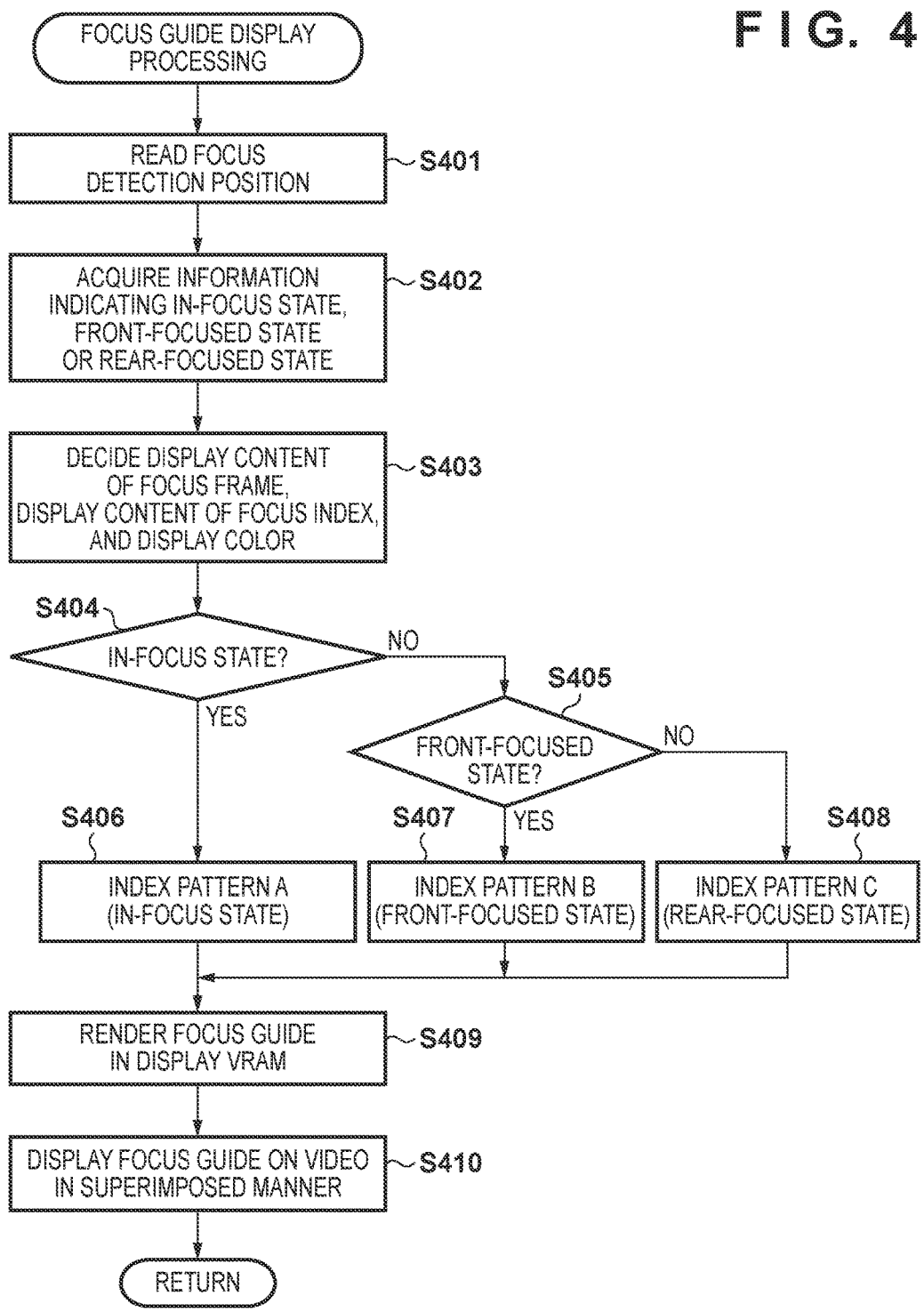
FIG. 4 is a flowchart illustrating focus guide display processing.

The focus guide display processing performed in S304 shown in FIGS. 3A-1 and 3B-2 will be described in detail. FIG. 4 shows a flowchart illustrating the focus guide display processing described in S304 shown in FIG. 3A-1.

In S401, the CPU 119a reads the focus detection position (focal point detection position) stored in the RAM 119c.

In S402, the CPU 119a acquires, with respect to the object corresponding to the focus detection position obtained in S401, focusing information from the focus detection unit 108. As described above, the focusing information includes information indicating any one of an in-focus state, front-focused state and rear-focused state, which was calculated based on the amount of defocus, and focusing degree information.

In S403, the CPU 119a decides the content of display in the focus guide to be rendered by the GPU 115 based on the focus guide display form decided in S301 shown in FIG. 3A and the information acquired in steps S401 and S402. The content of display in the focus guide includes the display position of the focus frame, the angle of focus indexes and display color. The display position of the focus frame is decided to be the focus detection position. The angle of focus indexes is decided based on the information indicating any one of in-focus state, front-focused state and rear-focused state and the focusing degree information in the case of the front-focused state or the rear-focused state. The display color is decided based on the information indicating any one of in-focus state, front-focused state and rear-focused state.

In S404, the CPU 119a determines, with respect to the focusing information acquired in S402, whether the object is in an in-focus state or an out-of-focus state. If it is determined that the object is in an in-focus state, the procedure proceeds to S406. If it is determined that the object is in an out-of-focus state, the procedure proceeds to S405.

In S405, the CPU 119a determines, with respect to the focusing information acquired in S402, whether the object is in a front-focused state or a rear-focused state. If it is determined that the object is in a front-focused state, the procedure proceeds to S407. If it is determined that the object is in a rear-focused state, the procedure proceeds to S408.

Figure 7A:
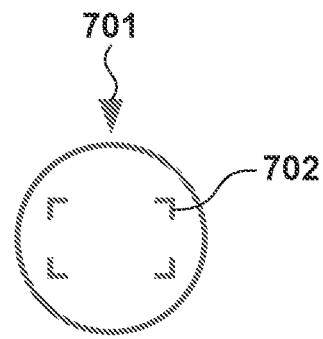
FIGS. 7A to 7C show display examples of a focus guide.
Figure 7B:
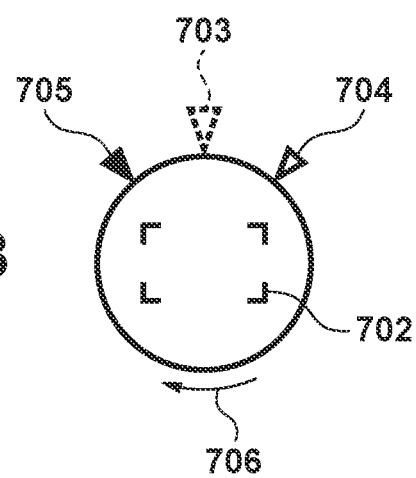
Figure 7C:
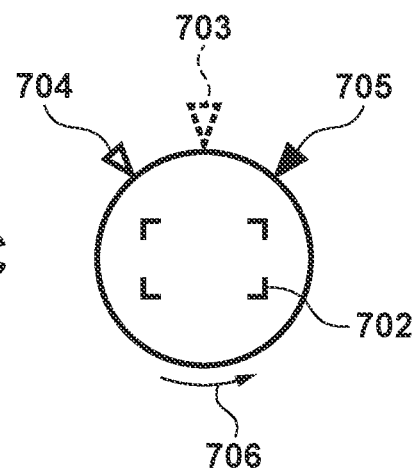

In S406, the CPU 119a selects focus guide display data of index pattern A, or in other words, in the case of the object being in an in-focus state. FIG. 7A shows an example of display by the display data of index pattern A. An index 701 shows an in-focus state (the state in which the camera is focusing on the object in the focal point detection region), and the index 701 is in a state in which three indexes including an index 703, an index 704 and an index 705, which will be described later with reference to FIGS. 7B and 7C, are overlapped each other and joined together. Also, the index 701 is displayed in a color (for example, green) different from those of the other states. By configuring the content of display as described above, in the in-focus state and states close to the in-focus state, the display area of the indexes is reduced as compared to the other states, and thus the influence when the user views the video can be reduced. A frame 702 indicates an object region corresponding to the focus detection position obtained in S401 in the live view image.

In S407, the CPU 119a selects focus guide display data of index pattern B, or in other words, in the case of the object being in a front-focused state. FIG. 7B shows an example of display by the display data of index pattern B. The index 703 indicates a target point of the index 704 and the index 705 for bringing into an in-focus state, and is indicated by a triangle pointing to the frame 702. The index 704 and the index 705 each indicate the focusing degree of the focus detection position by the display distance therebetween. Because the focusing degree varies in response to a change in the distance between the object and the digital camera 10, the display position is dynamically changed by the index 704 and the index 705 being moved closer to or away from each other. The distance (angle) between the index 704 and the index 705 is changed based on the focusing degree information such that the display distance is smaller (or narrowed, the angle becomes small) when a deviation from the in-focus state in the focal point detection region is small than when the deviation from the in-focus state in the focal point detection region is large. Also, an arrow 706 indicates the direction in which the focus ring 134 needs to be rotated to bring into an in-focus state. With this configuration, even if the user is inexperienced in operation of the focus ring 134, the user can smoothly operate the focus ring 134 in the in-focus direction without being indecisive about the direction of rotation. In the case where the display unit 107 is a variable angle monitor, a tilt monitor or the like in which the direction of the focus ring 134 is changeable, by detecting the direction of the display unit 107 and changing the direction of the arrow 706, it is possible to cope with any direction of the display unit 107.

In S408, the CPU 119a selects focus guide display data of index pattern C, or in other words, in the case of the object being in a rear-focused state. FIG. 7C shows an example of display by the display data of index pattern C. The index configuration is different from that shown in FIG. 7B, to be specific, the positions of the index 704 and the index 705 are reversed. By configuring the content of display as described above, the user can determine, at a glance, whether the object is in a front-focused state or in a rear-focused. Also, the arrow 706 points in a direction opposite to that shown in FIG. 7B, from which it can be seen that the direction of rotation of the focus ring 134 that needs to be performed in the in-focus direction is different.

In S409, the CPU 119a causes the GPU 115 to render the focus guide display data selected in any one of steps S406 to S408 into the display VRAM by using the content of display decided in S403.

In S410, the CPU 119a causes the display I/F unit 106 to display, in a superimposed manner, the focus guide rendered in the VRAM in S409 on the video (live view image) on the display unit 107.

As described above, the focus guide presents, to the user, the operational direction and the amount of operation of the focus ring 134 required to bring the object at the focus detection position (focal point detection position) into an in-focus state. To rephrase it, the focus guide shows the focusing degree (the degree of out-of-focus) of the object at the focus detection position. To further rephrase it, the focus guide shows a deviation between the current focal distance and the focal distance when the camera is focusing on the object at the focus detection position. To further rephrase it, the focus guide shows the relationship between the in-focus position (the distance between the current focus position and the digital camera 10) and the distance to the object at the focus detection position (the distance between the digital camera 10 and the object).

Focus Guide Display Form Deciding Processing

Figure 5A:
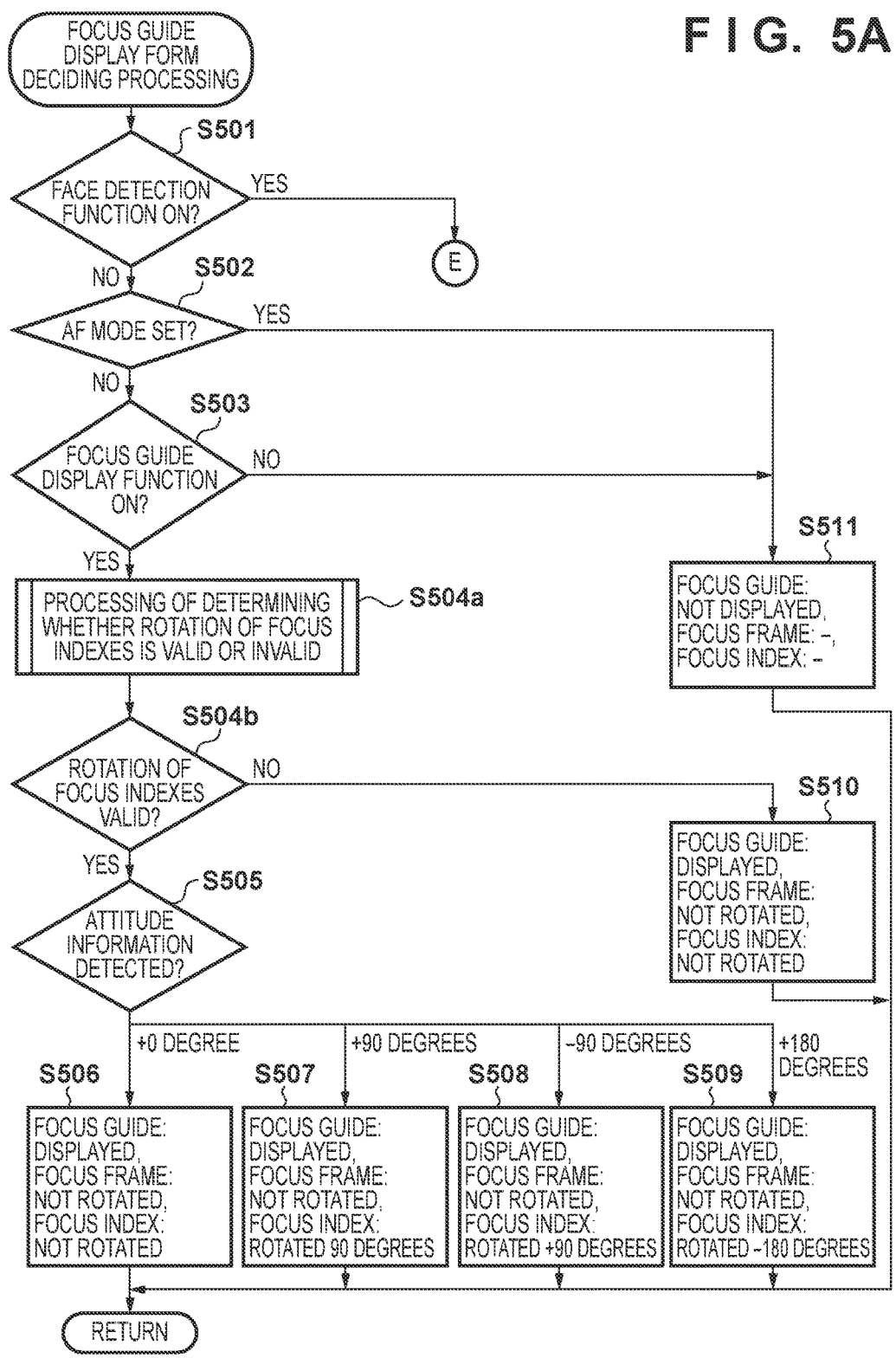
FIGS. 5A and 5B are flowcharts illustrating focus guide display form deciding processing.
Figure 5B:
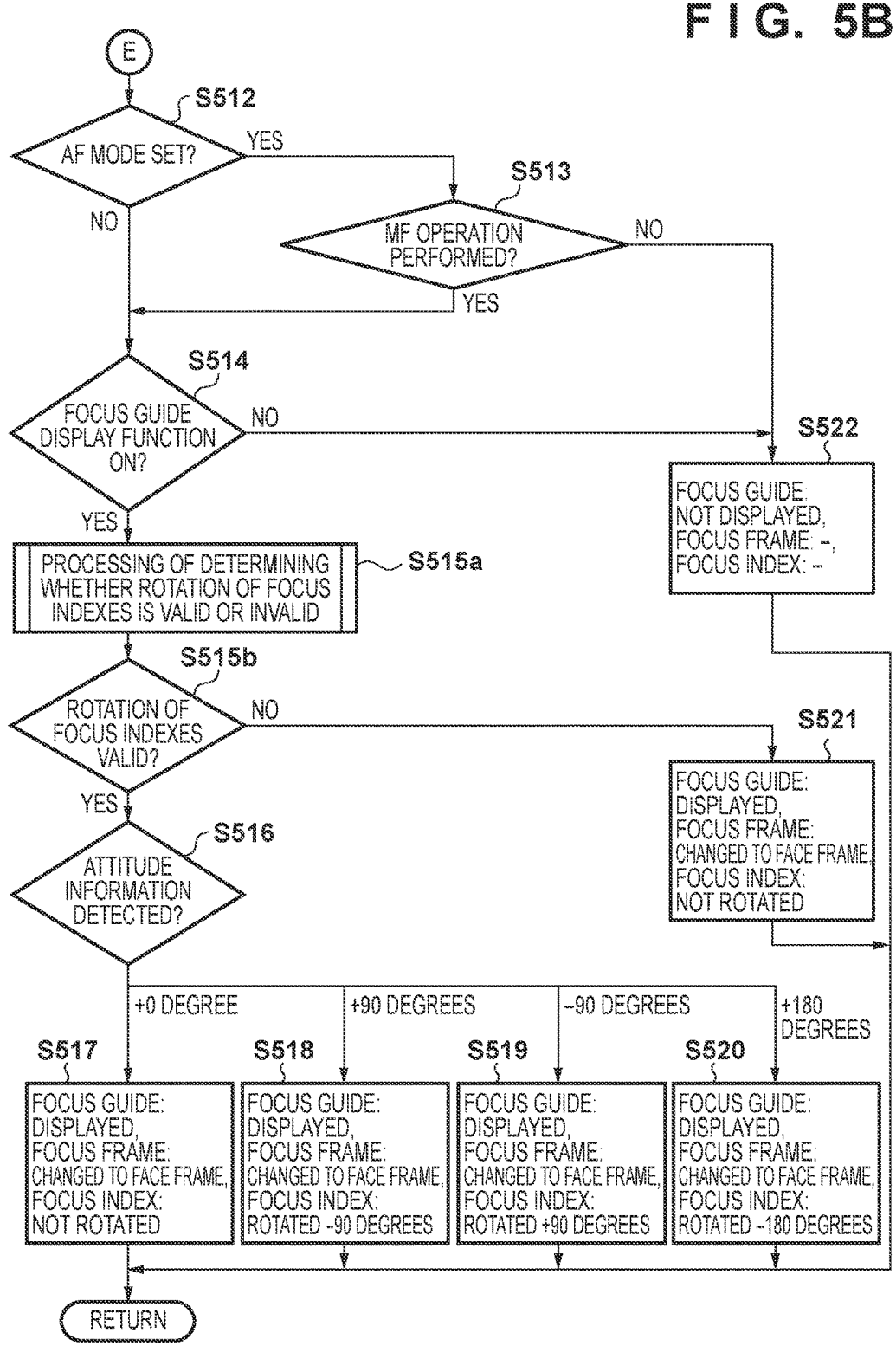

Next, the focus guide display form deciding processing in S301 shown in FIG. 3A-1 will be described with reference to the flowchart shown in FIGS. 5A and 5B.

In S501, the CPU 119a determines whether or not the face detection function has been set to ON by referencing to the settings information stored in the ROM 119b. If the face detection function was switched to ON in steps S314 and S315 shown in FIG. 3A-2, it is determined that the face detection function is ON. If it is determined that the face detection function has been set to ON, the procedure proceeds to S512. Otherwise, the procedure proceeds to S502.

In S502, the CPU 119a determines whether the AF mode has been set by the AF/MF switch 135. If it is determined that the AF mode has been set, the procedure proceeds to S511. Otherwise (in other words, if it is determined that the MF mode has been set), the procedure proceeds to S503.

In S503, the CPU 119a determines whether or not the focus guide display function has been set to ON by referencing to the settings information stored in the ROM 119b. If the focus guide display function was set to ON in S313 shown in FIG. 3A-2, it is determined that the focus guide display function is ON. If it is determined that the focus guide display function has been set to ON, the procedure proceeds to S504. Otherwise, the procedure proceeds to S511.

In S504a, the CPU 119a determines whether the rotation of focus indexes is valid or invalid. The processing of determining whether the rotation of focus indexes is valid or invalid will be described later in detail with reference to FIG. 6.

In S504b, the CPU 119a determines, as a result of the determination made in S504a, that the rotation of focus indexes is valid, the procedure proceeds to S505. Otherwise, the procedure proceeds to S510.

In S505, the CPU 119a detects the attitude information of the digital camera 10 by using the attitude detection unit 136. If the attitude information indicates +0 degrees (normal position), the procedure proceeds to S506. If the attitude information indicates +90 degrees (rotated 90 degrees to the right), the procedure proceeds to S507. If the attitude information indicates −90 degrees (rotated 90 degrees to the left), the procedure proceeds to S508. If the attitude information indicates +180 degrees (rotated 180 degrees to the right or left), the procedure proceeds to S509.

Figure 8A:
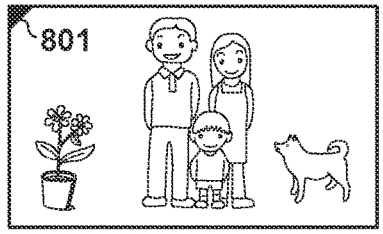
FIGS. 8A to 8I show display examples of a focus guide screen when a face detection function is OFF.
Figure 8B:
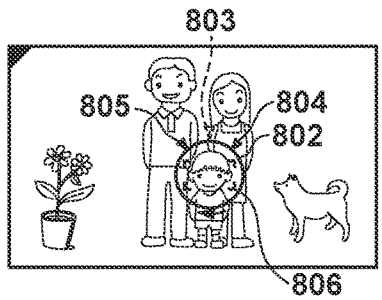

In S506, the CPU 119a sets the focus guide display form to "focus guide: displayed, focus frame: not rotated, focus index: not rotated" and stores the settings of the focus guide display form in the RAM 119c. As a result, a screen as shown in FIG. 8B, which will be described later, is displayed on the display unit 107.

Figure 8C:
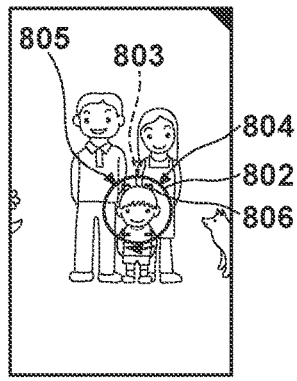

In S507, the CPU 119a sets the focus guide display form to "focus guide: displayed, focus frame: not rotated, focus index: −90 degrees (rotated 90 degrees to the left)", and stores the settings of the focus guide display form in the RAM 119c. As a result, a screen as shown in FIG. 8C, which will be described later, is displayed on the display unit 107.

Figure 8D:
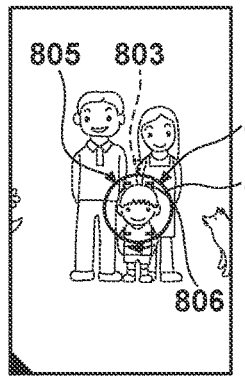

In S508, the CPU 119a sets the focus guide display form to "focus guide: displayed, focus frame: not rotated, focus index: rotated +90 degrees (rotated 90 degrees to the right)", and stores the settings of the focus guide display form in the RAM 119c. As a result, a screen as shown in FIG. 8D, which will be described later, is displayed on the display unit 107.

Figure 8E:
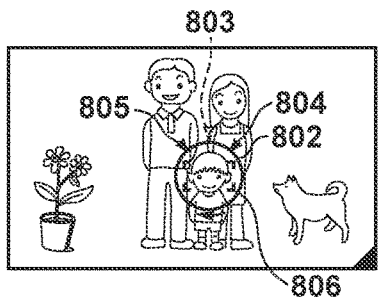

In S509, the CPU 119a sets the focus guide display form to "focus guide: displayed, focus frame: not rotated, focus index: rotated −180 degrees (rotated 180 degrees to the right or left)", and stores the settings of the focus guide display form in the RAM 119c. As a result, a screen as shown in FIG. 8E, which will be described later, is displayed on the display unit 107.

In S510, the CPU 119a sets the focus guide display form to "focus guide: displayed, focus frame: not rotated, focus index: not rotated", and stores the settings of the focus guide display form in the RAM 119c. As a result, screens as shown in FIGS. 8F to 8I, which will be described later, are displayed on the display unit 107.

In S511, the CPU 119a sets the focus guide display form to "focus guide: not displayed" and stores the setting of the focus guide display form in the RAM 119c. As a result, a screen as shown in FIG. 8A, which will be described later, is displayed on the display unit 107.

In S512, the CPU 119a determines whether or not the AF mode has been set by the AF/MF switch 135. If it is determined that the AF mode has been set, the procedure proceeds to S513. Otherwise (in other words, if it is determined that the MF mode has been set), the procedure proceeds to S514.

In S513, the CPU 119a determines whether or not a MF operation has been performed by the user. If it is determined that a MF operation has been performed, the procedure proceeds to S514. Otherwise, the procedure proceeds to S522.

In S514, as in S503 described above, the CPU 119a determines whether or not the focus guide display function has been set to ON by referencing to the settings information stored in the ROM 119b. If it is determined that the focus guide display function has been set to ON, the procedure proceeds to S515a. Otherwise, the procedure proceeds to S522.

In S515a, as in S504a described above, the CPU 119a determines whether the rotation of focus indexes is valid or invalid. The processing of determining whether the rotation of focus indexes is valid or invalid will be described later in detail with reference to FIG. 6.

In S515b, as in S504b described above, if the CPU 119a determines, as a result of the determination made in S515a, that the rotation of focus indexes is valid, the procedure proceeds to S516. Otherwise, the procedure proceeds to S521.

In S516, as in S505 described above, the CPU 119*a* detects the attitude information of the digital camera 10. If the attitude information indicates +0 degrees (normal position), the procedure proceeds to S517. If the attitude information indicates +90 degrees (rotated 90 degrees to the right), the procedure proceeds to S518. If the attitude information indicates −90 degrees (rotated 90 degrees to the left), the procedure proceeds to S519. If the attitude information indicates +180 degrees (rotated 180 degrees to the right or left), the procedure proceeds to S520.

Figure 9A:
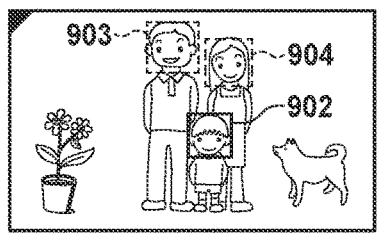
Figure 9B:
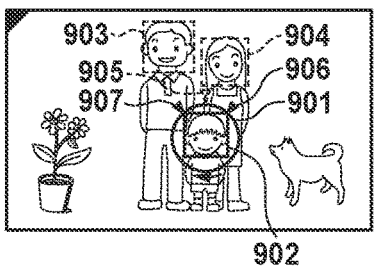

In S517, the CPU 119*a* sets the focus guide display form to "focus guide: displayed, focus frame: changed to face frame, focus index: not rotated", and stores the settings of the focus guide display form in the RAM 119*c*. As a result, a screen as shown in FIG. 9B, which will be described later, is displayed on the display unit 107.

Figure 9C:
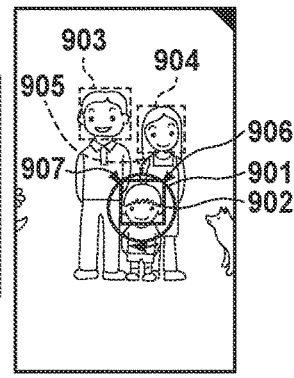

In S518, the CPU 119*a* sets the focus guide display form to "focus guide: displayed, focus frame: changed to face frame, focus index: rotated −90 degrees (rotated 90 degrees to the left)", and stores the settings of the focus guide display form in the RAM 119*c*. As a result, a screen as shown in FIG. 9C, which will be described later, is displayed on the display unit 107.

Figure 9D:
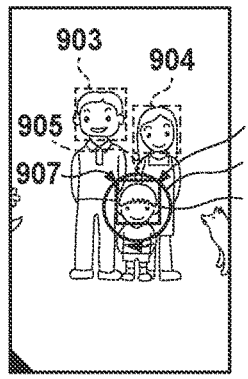

In S519, the CPU 119*a* sets the focus guide display form to "focus guide: displayed, focus frame: changed to face frame, focus index: rotated +90 degrees (rotated 90 degrees to the right)", and stores the settings of the focus guide display form in the RAM 119*c*. As a result, a screen as shown in FIG. 9D, which will be described later, is displayed on the display unit 107.

Figure 9E:
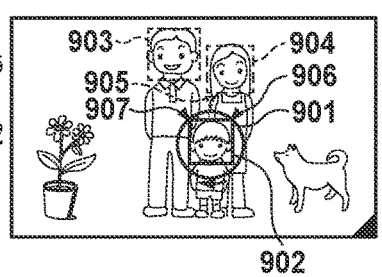

In S520, the CPU 119*a* sets the focus guide display form to "focus guide: displayed, focus frame: changed to face frame, focus index: rotated −180 degrees (rotated 180 degrees to the right or left)" and stores the settings of the focus guide display form in the RAM 119*c*. As a result, a screen as shown in FIG. 9E, which will be described later, is displayed on the display unit 107.

In S521, the CPU 119*a* sets the focus guide display form to "focus guide: displayed, focus frame: changed to face frame, focus index: not rotated", and stores the settings of the focus guide display form in the RAM 119*c*. As a result, screens as shown in FIGS. 9F to 9I, which will be described later, are displayed on the display unit 107.

In S522, the CPU 119*a* sets the focus guide display form to "focus guide: not displayed", and stores the setting of the focus guide display form in the RAM 119*c*. As a result, a screen as shown in FIG. 9A, which will be described later, is displayed on the display unit 107.

Example of Display of Focus Guide Screen

Next, an example of display of a focus guide screen obtained through the focus guide display form deciding processing shown in FIGS. 5A and 5B will be described.

FIGS. 8A to 8I and FIGS. 9A to 9I show display examples of a screen output to the display unit 107. Here, although not shown in FIGS. 8A to 8I and FIGS. 9A to 9I, unless the setting of Disp level is set to "information not displayed", information, such as grid lines, remaining battery power level, remaining time for shooting is also displayed in a superimposed manner, on the live view image according to the Disp level. Also, a black triangle 801 shown in FIG. 8A indicates the upper left corner of the display unit 107 when the digital camera 10 is in a normal position (when the attitude information indicates +0 degrees), and the black triangle 801 in other diagrams such as FIGS. 8B to 8I and FIGS. 9A to 9I has the same function. The triangle 801 is shown only for the purpose of ease of understanding of a change in the camera attitude (the direction of rotation of the screen), and thus it is not actually displayed on the display unit 107. Also, in the following description, the case where the face detection function described in steps S314 and S315 shown in FIG. 3A-2 has been set to ON will be simply referred to as "face detection being ON", and the case where the face detection function has been set to OFF will be simply referred to as "face detection being OFF".

FIG. 8A shows an example of display of the screen displayed in the case of the face detection being OFF and the AF mode being set and in the case of the face detection being OFF, the MF mode being set and the focus guide display function being set to ON. In this case, a live view image is displayed on the display unit 107, and the focus guide and the face frame are not displayed.

FIG. 8B shows an example of display of the screen displayed in the case of the face detection being OFF, the MF mode being set, the focus guide display function being set to ON, the rotation of focus indexes being valid, and the attitude information indicating +0 degrees (normal position). A focus guide 802 is displayed on the display unit 107 by being superimposed on the live view image. Because the attitude information of the digital camera 10 indicates +0 degrees (normal position), a focus frame 806 and focus indexes 803 to 805 of the focus guide 802 are displayed in the normal position (+0 degrees). The processing of determining whether the rotation of the focus indexes 803 to 805 is valid or invalid will be described later in detail with reference to FIG. 6.

FIG. 8C shows an example of display of the screen displayed in the case of the face detection being OFF, the MF mode being set, the focus guide display function being set to ON, the rotation of focus indexes being valid, and the attitude information indicating +90 degrees (rotated 90 degrees to the right). The focus guide 802 is displayed on the display unit 107 by being superimposed on the live view image. In response to the digital camera 10 being rotated 90 degrees to the right (rotated +90 degrees), the focus frame 806 of the focus guide 802 is rotated 90 degrees to the right (rotated +90 degrees) from the position shown in FIG. 8B and the focus indexes 803 to 805 are rotated 90 degrees to the left (rotated −90 degrees) from their position shown in FIG. 8B.

FIG. 8D shows an example of display of the screen displayed in the case of the face detection being OFF, the MF mode being set, the focus guide display function being set to ON, the rotation of focus indexes being valid, and the attitude information indicating −90 degrees (rotated 90 degrees to the left). The focus guide 802 is displayed on the display unit 107 by being superimposed on the live view image. In response to the digital camera 10 being rotated 90 degrees to the left (rotated −90 degrees), the focus frame 806 of the focus guide 802 is rotated 90 degrees to the left (rotated −90 degrees), and the focus indexes 803 to 805 are rotated 90 degrees to the right (rotated +90 degrees) from their position shown in FIG. 8B.

FIG. 8E shows an example of display of the screen displayed in the case of the face detection being OFF, the MF mode being set, the focus guide display function being set to ON, the rotation of focus indexes being valid, and the attitude information indicating +180 degrees (rotated 180 degrees to the right or left). The focus guide 802 is displayed on the display unit 107 by being superimposed on the live view image. In response to the digital camera 10 being rotated 180 degrees to the right or left (rotated +180 degrees or rotated −180 degrees), the focus frame 806 of the focus guide 802 is rotated 180 degrees to the right or left (rotated +180 degrees or rotated −180 degrees), and the focus indexes 803 to 805 are rotated 180 degrees to the right or left (rotated −180 degrees or rotated +180 degrees) from their position shown in FIG. 8B.

Figure 8F:
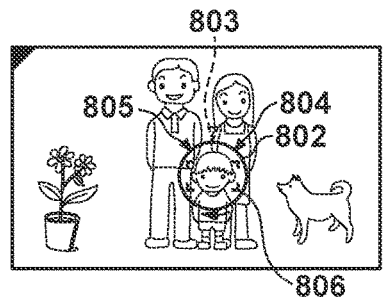

FIG. 8F shows an example of display of the screen displayed in the case of the face detection being OFF, the MF mode being set, the focus guide display function being set to ON, the rotation of focus indexes being invalid, and the attitude information indicating +0 degrees (normal position). As in FIG. 8B, the focus guide 802 is displayed on the display unit 107 by being superimposed on the live view image.

Figure 8G:
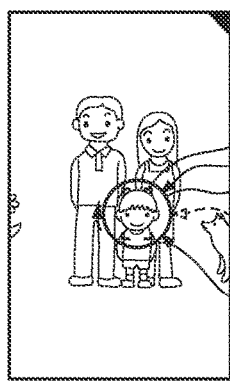

FIG. 8G shows an example of display of the screen displayed in the case of the face detection being OFF, the MF mode being set, the focus guide display function being set to ON, the rotation of focus indexes being invalid, and the attitude information indicating +90 degrees (rotated 90 degrees to the right). The focus guide 802 is displayed on the display unit 107 by being superimposed on the live view image. Despite the fact that the digital camera 10 has been rotated 90 degrees to the right (rotated +90 degrees) from the position shown in FIG. 8F, the focus indexes 803 to 805 of the focus guide 802 are not rotated along with the focus frame 806.

Figure 8H:
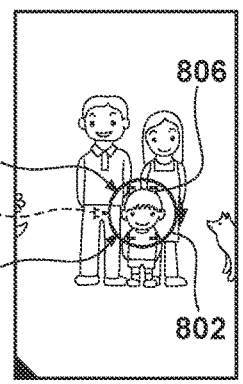

FIG. 8H shows an example of display of the screen displayed in the case of the face detection being OFF, the MF mode being set, the focus guide display function being set to ON, the rotation of focus indexes being invalid, and the attitude information indicating −90 degrees (rotated 90 degrees to the left). The focus guide 802 is displayed on the display unit 107 by being superimposed on the live view image. Despite the fact that the digital camera 10 has been rotated 90 degrees to the left (rotated −90 degrees) from the position shown in FIG. 8F, the focus indexes 803 to 805 of the focus guide 802 are not rotated along with the focus frame 806.

Figure 8I:
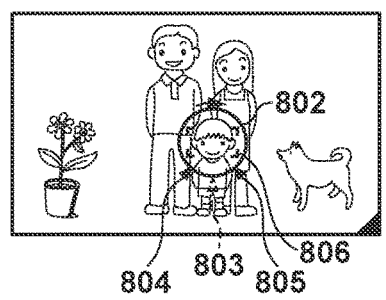

FIG. 8I shows an example of display of the screen displayed in the case of the face detection being OFF, the MF mode being set, the focus guide display function being set to ON, the rotation of focus indexes being invalid, and the attitude information indicating +180 degrees (rotated 180 degrees to the right or left). The focus guide 802 is displayed on the display unit 107 by being superimposed on the live view image. Despite the fact that the digital camera 10 has been rotated 180 degrees to the right or left (rotated +180 degrees or rotated −180 degrees) from the position shown in FIG. 8F, the focus indexes 803 to 805 of the focus guide 802 are not rotated along with the focus frame 806.

FIG. 9A shows an example of display of the screen displayed in the case of the face detection being ON, the AF mode being set, and an MF operation not being performed and in the case of the face detection being ON, the MF mode being set, and the focus guide display function being set to OFF. In this case, a live view image is displayed on the display unit 107, and face frames 902, 903 and 904 are displayed without the focus guide being displayed. The face frames 902 to 904 are displayed at the positions of the faces detected from a captured image. The face frame 902 is a frame that indicates the main face, and the face frames 903 and 904 are frames that indicate faces (secondary faces) other than the main face. Even when, for example, the AF mode has been set to the one-shot AF mode in S317 shown in FIG. 3A-2, and the AF mode is set by the AF/MF switch 135, an MF operation is possible as a result of the user operating the focus ring 134. Also, an MF operation is also possible even when the AF mode has been set to the continuous AF, and the camera is brought into an AF locked state as a result of the AF lock key 130 being pressed.

FIG. 9B shows an example of display of the screen displayed in the case of the face detection being ON, the MF mode being set, the focus guide display function being set to ON, the rotation of focus indexes being valid, and the attitude information indicating +0 degrees (normal position). The face frames 902, 903 and 904 and a focus guide 901 are displayed on the display unit 107 by being superimposed on the live view image. Also, the display position of the focus guide 901 is the same as the position of the main face frame 902, and the focus frame 806 in FIGS. 8A to 8I has been replaced by the main face frame 902. Because the attitude information of the digital camera 10 indicates +0 degrees (normal position), focus indexes 905 to 907 of the focus guide 901 are displayed in the normal position (+0 degrees).

FIG. 9C shows an example of display of the screen displayed in the case of the face detection being ON, the MF mode being set, the focus guide display function being set to ON, the rotation of focus indexes being valid, and the attitude information indicating +90 degrees (rotated 90 degrees to the right). The face frames 902, 903 and 904 and the focus guide 901 are displayed on the display unit 107 by being superimposed on the live view image. Also, the display position of the focus guide 901 is the same as the position of the main face frame 902, and the focus frame 806 shown in FIGS. 8A to 8I has been replaced by the main face frame 902. In response to the digital camera 10 being rotated 90 degrees to the right (rotated +90 degrees), the focus indexes 905 to 907 of the focus guide 901 are rotated 90 degrees to the left (rotated −90 degrees).

FIG. 9D shows an example of display of the screen displayed in the case of the face detection being ON, the MF mode being set, the focus guide display function being set to ON, the rotation of focus indexes being valid, and the attitude information indicating −90 degrees (rotated 90 degrees to the left). The face frames 902, 903 and 904 and the focus guide 901 are displayed on the display unit 107 by being superimposed on the live view image. Also, the display position of the focus guide 901 is the same as the position of the main face frame 902, and the focus frame 806 shown in FIGS. 8A to 8I has been replaced by the main face frame 902. In response to the digital camera 10 being rotated 90 degrees to the left (rotated −90 degrees), the focus indexes 905 to 907 of the focus guide 901 are rotated 90 degrees to the right (rotated +90 degrees).

FIG. 9E shows an example of display of the screen displayed in the case of the face detection being ON, the MF mode being set, the focus guide display function being set to ON, the rotation of focus indexes being valid, and the attitude information indicating +180 degrees (rotated 180 degrees to the right or left). The face frames 902, 903 and 904 and the focus guide 901 are displayed on the display unit 107 by being superimposed on the live view image. Also, the display position of the focus guide 901 is the same as the position of the main face frame 902, and the focus frame 806 shown in FIGS. 8A to 8I has been replaced by the main face frame 902. In response to the digital camera 10 being rotated 180 degrees to the right or left (rotated +180 degrees or rotated −180 degrees), the focus indexes 905 to 907 of the focus guide 901 are rotated 180 degrees to the right or left (rotated −180 degrees or rotated +180 degrees).

Figure 9F:
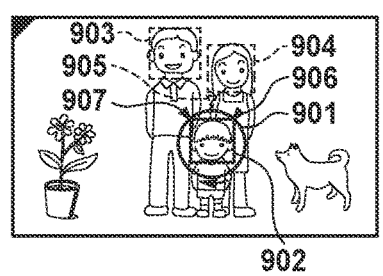

FIG. 9F shows an example of display of the screen displayed in the case of the face detection being ON, the MF mode being set, the focus guide display function being set to ON, the rotation of focus indexes being invalid, and the attitude information indicating +0 degrees (normal position). As in FIG. 9B, the face frames 902, 903 and 904 and the focus guide 901 are displayed on the display unit 107 by being superimposed on the live view image. Also, the display position of the focus guide 901 is the same as the position of the main face frame 902, and the focus frame 806 shown in FIGS. 8A to 8I has been replaced by the main face frame 902.

Figure 9G:
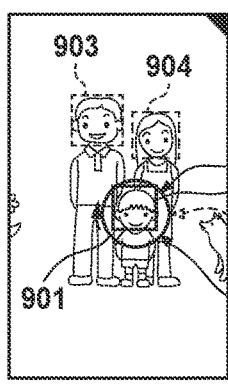

FIG. 9G shows an example of display of the screen displayed in the case of the face detection being ON, the MF mode being set, the focus guide display function being set to ON, the rotation of focus indexes being invalid, and the attitude information indicating +90 degrees (rotated 90 degrees to the right). The face frames 902, 903 and 904 and the focus guide 901 are displayed on the display unit 107 by being superimposed on the live view image. Also, the display position of the focus guide 901 is the same as the position of the main face frame 902, and the focus frame 806 shown in FIGS. 8A to 8I has been replaced by the main face frame 902. Despite the fact that the digital camera 10 has been rotated 90 degrees to the right (rotated +90 degrees), the focus indexes 905 to 907 of the focus guide 901 are not rotated.

Figure 9H:
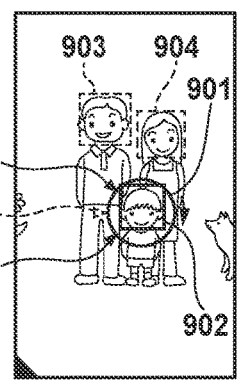

FIG. 9H shows an example of display of the screen displayed in the case of the face detection being ON, the MF mode being set, the focus guide display function being set to ON, the rotation of focus indexes being invalid, and the attitude information indicating −90 degrees (rotated 90 degrees to the left). The face frames 902, 903 and 904 and the focus guide 901 are displayed on the display unit 107 by being superimposed on the live view image. Also, the display position of the focus guide 901 is the same as the position of the main face frame 902, and the focus frame 806 shown in FIGS. 8A to 8I has been replaced by the main face frame 902. Despite the fact that the digital camera 10 has been rotated 90 degrees to the left (rotated −90 degrees), the focus indexes 905 to 907 of the focus guide 901 are not rotated.

Figure 9I:
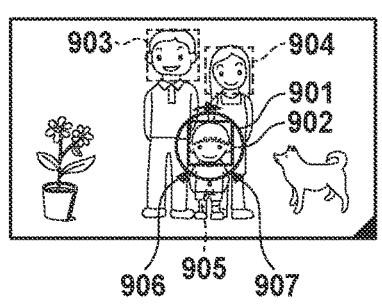

FIG. 9I shows an example of display of the screen displayed in the case of the face detection being ON, the MF mode being set, the focus guide display function being set to ON, the rotation of focus indexes being invalid, and the attitude information indicating +180 degrees (rotated 180 degrees to the right or left). The face frames 902, 903 and 904 and the focus guide 901 are displayed on the display unit 107 by being superimposed on the live view image. Also, the display position of the focus guide 901 is the same as the position of the main face frame 902, and the focus frame 806 shown in FIGS. 8A to 8I has been replaced by the main face frame 902. Despite the fact that the digital camera 10 has been rotated 180 degrees to the right or left (rotated +180 degrees or rotated −180 degrees), the focus indexes 905 to 907 of the focus guide 901 are not rotated.

Processing of Determining Whether Rotation of Focus Indexes is Valid or Invalid

Next, the processing of determining whether the rotation of focus indexes is valid or invalid performed in steps S504a and S515a shown in FIGS. 5A and 5B will be described in detail with reference to the flowchart shown in FIG. 6.

This processing is processing in which either a value "valid" or a value "invalid" is returned as a result of determination. The RAM 119c in the main microcontroller 119 has a storage for storing the returned value (hereinafter referred to as the determined result). The determined result may also take either a value "valid" or a value "invalid", and the same applies to the initial value.

In S601, as in S328 described above, the CPU 119a determines whether or not the camera is in an AF locked state as a result of the AF lock key 130 being pressed. If it is determined that the camera is in an AF locked state, the procedure proceeds to S609. Otherwise, the procedure proceeds to S602.

In S602, as in S336 described above, the CPU 119a determines whether or not a moving image recording operation is currently performed (whether or not shooting is currently recorded). If it is determined that a recording operation is currently performed, the procedure proceeds to S609. Otherwise (if the camera is currently in a shooting standby state), the procedure proceeds to S603.

In S603, the CPU 119a determines whether or not a still image recording operation is currently performed. That is, as in steps from S339 to S342 described above, the CPU 119a determines whether the still image release key 133 has been half pressed or fully pressed. If it is determined that a still image recording operation is currently performed, the procedure proceeds to S609. Otherwise, the procedure proceeds to S604.

In S604, the CPU 119a determines whether or not a touch operation has been detected on the touch panel (touch detection). If it is determined that a touch operation has been detected, the procedure proceeds to S605. Otherwise, the procedure proceeds to S608.

In S605, the CPU 119a determines whether the returned value stored in the RAM 119c as the determined result indicates "valid" or "invalid". If it is determined that the returned value indicates "valid", the procedure proceeds to S607. If it is determined that the returned value indicates "invalid", the procedure proceeds to S606.

In S606, the CPU 119a stores a value "valid" as the determined result. In S607, the CPU 119a stores a value "invalid" as the determined result. In S608, the CPU 119a returns the value stored as the determined result. In S609, the CPU 119a returns a value "invalid". Note that the value stored as the determined result is not updated.

The menu items for the digital camera 10 may include an item that allows the user to switch the setting of the rotation of the focus index between valid and invalid. In this case, the CPU 119a determines whether or not the setting value of the menu item has been switched, and stores the set value as the determined result.

As described above, according to the present embodiment, display control is performed such that in the focus guide, the focus indexes are rotated in response to the camera attitude being changed to a position different from the position by 90 degrees, but the focus frame is not rotated despite the fact that the camera attitude has been changed. With this configuration, it is possible to solve the problem in that the direction of the focal point detection region and the direction of the focus frame do not coincide with each other in a configuration in which the focal point detection region has a different height-width proportion due to constraints on the pixel configuration in an image sensor, or the like. As described above, according to the present embodiment, the focusing degree can be correctly displayed even when the camera attitude is changed, and a guide display that allows the user to easily perform focus adjustment can be provided.

Other Embodiments

Note that a single item of hardware may control the CPU 119a of the main body microcomputer 119, or the entire apparatus may be controlled by a plurality of items of hardware sharing processing.

Although the present invention has been elaborated above based on suitable embodiments thereof, the present invention is by no means limited to these specific embodiments and includes various modifications without departing from the concept of the present invention. The above embodiments are merely illustrative embodiments of the present invention, and may be combined where appropriate.

Also, in the embodiments given above, an example has been described in which the present invention is applied to the digital camera 10, but the present invention is not limited to the example, and is applicable to any display control apparatus that is capable of displaying focus information for the focus detection position. As described above, the present invention is applicable not only to a digital camera including an image sensor in its body, but also to an apparatus that does not include an image sensor in the camera body, and that is capable of displaying a focusing state for the focus detection position by remotely receiving a live view image captured by another image capturing apparatus. The present invention is applicable to, for example, display control when remotely shooting images with a smart phone, a tablet PC or the like connected to an image capturing apparatus in a wireless or wired manner. As described above, the present invention is applicable to a personal computer, a PDA, a mobile phone terminal, a portable image viewer, a music player, a game console, an electronic book reader and the like.

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-019247, filed Feb. 3, 2016 which is hereby incorporated by reference herein in its entirety.

What is claimed is:

1. A display control apparatus comprising:
one or more processors; and
at least one memory storing instructions which, when executed by the one or more processors, cause the display control apparatus to:
acquire focusing state information indicating a focusing state of a specific region having a different height-width proportion in a captured image obtained by an image capturing device;
perform control so as to display, together with the captured image, a first display element indicating the specific region and a second display element indicating the acquired focusing state on a display unit;
detect an attitude of the display control apparatus; and
perform control so as to rotate and display the second display element without rotating the first display element if the attitude of the display control apparatus has been changed from a first attitude to a second attitude that is different from the first attitude by 90 degrees.

2. The display control apparatus according to claim 1, wherein in acquiring the focusing state information, the instructions, when executed by the one or more processors, cause the display control apparatus to acquire, as the focusing state information, information regarding a focusing degree, and
wherein, in performing the control so as to display, the instructions, when executed by the one or more processors, cause the display control apparatus to perform control so as to display the second display element indicating the focusing degree.

3. The display control apparatus according to claim 1, wherein in acquiring the focusing state information, the instructions, when executed by the one or more processors, cause the display control apparatus to acquire, as the focusing state information, information indicating any one of an in-focus state, a front-focused state and a rear-focused state, and
wherein, in performing the control so as to display, the instructions, when executed by the one or more processors, cause the display control apparatus to perform control so as to display the second display element indicating any one of the in-focus state, the front-focused state and the rear-focused state.

4. The display control apparatus according to claim 3, wherein the instructions, when executed by the one or more processors, further cause the display control apparatus to perform control so as to display the second display elements in a different configuration between the front-focused state and the rear-focused state.

5. The display control apparatus according to claim 1, wherein the focusing state information is an amount of defocus.

6. The display control apparatus according to claim 1, wherein
the first display element is displayed in a position corresponding to the specific region, and
the second display element is displayed in a position corresponding to the display position of the first display element.

7. The display control apparatus according to claim 1, wherein the instructions, when executed by the one or more processors, further cause the display control apparatus to:
perform a still image recording preparation operation and a still image recording operation;
perform control so as to display and not rotate the second display element when the still image recording preparation operation or the still image recording operation is performed; and perform control so as to rotate and display the second display element when the still image recording preparation operation and the still image recording operation are not performed.

8. The display control apparatus according to claim 1, wherein the instructions, when executed by the one or more processors, further cause the display control apparatus to:
    perform a moving image recording operation;
    perform control so as to display and not rotate the second display element when the moving image recording operation is performed; and
    perform control so as to rotate and display the second display element when the moving image recording operation is not performed.

9. The display control apparatus according to claim 1, wherein the instructions, when executed by the one or more processors, further cause the display control apparatus to:
    perform focus control;
    perform control so as to display and not rotate the second display element when the performed focus control is terminated; and
    perform control so as to rotate and display the second display element when the termination of the focus control is released.

10. The display control apparatus according to claim 1, wherein the instructions, when executed by the one or more processors, further cause the display control apparatus to:
    detect object regions from the captured image;
    decide any one of the detected object regions to be the specific region;
    accept a manual focus operation from a user; and
    display the first display element in a position of the specific region when the manual focus operation is performed during the detection of the object regions.

11. The display control apparatus according to claim 10, wherein
    the first display element is a frame displayed in the decided object region, and
    wherein the instructions, when executed by the one or more processors, further cause the display control apparatus to change a shape of the frame when the detection of the object regions is performed.

12. The display control apparatus according to claim 1, further comprising a touch detector configured to detect a touch operation to the display unit,
    wherein the instructions, when executed by the one or more processors, further cause the display control apparatus to determine whether or not to rotate and display the second display element each time the touch operation is detected by the touch detector.

13. The display control apparatus according to claim 1, wherein the instructions, when executed by the one or more processors, further cause the display control apparatus to set whether or not to rotate and display the second display element.

14. The display control apparatus according to claim 1, wherein the first display element is a frame superimposed on the captured image and displayed in the specific region.

15. The display control apparatus according to claim 1, wherein
    the second display element includes a plurality of indexes that indicate a focusing state in the specific region in which the first display element is displayed,
    the plurality of indexes include at least a first index and a second index that indicate a focusing degree based on their display positions in relation to each other and a third index indicating an in-focus position, and indicate that an object indicated by the first display element is in focus as a result of the first index and the second index being joined together in a position indicated by the third index.

16. The display control apparatus according to claim 15, wherein the instructions, when executed by the one or more processors, further cause the display control apparatus to:
    perform control so as to change a display distance between the first index and the second index according to the focusing degree; and
    perform control such that the display distance is smaller when a deviation from the in-focus position is small than when the deviation is large.

17. The display control apparatus according to claim 1, wherein the second display element includes a display element that indicates an operational direction according to which a focus operation is performed to bring the object into focus.

18. The display control apparatus according to claim 1, wherein the display control apparatus is an image capturing apparatus that captures an image.

19. A control method of a display control apparatus comprising:
    acquiring focusing state information indicating a focusing state of a specific region having a different height-width proportion in a captured image obtained by an image capturing device;
    performing control so as to display, together with the captured image, a first display element indicating the specific region and a second display element indicating the acquired focusing state on a display unit; and
    performing control so as to rotate and display the second display element without rotating the first display element in response to detecting that an attitude of the display control apparatus has been changed from a first attitude to a second attitude that is different from the first attitude by 90 degrees.

20. A non-transitory computer-readable storage medium storing a program for causing a computer to function as a display control apparatus, wherein the program, when executed by one or more processors, cause the computer to:
    acquire focusing state information indicating a focusing state of a specific region having a different height-width proportion in a captured image obtained by an image capturing device;
    perform control so as to display, together with the captured image, a first display element indicating the specific region and a second display element indicating the acquired focusing state on a display unit;
    detect an attitude of the display control apparatus; and
    perform control so as to rotate and display the second display element without rotating the first display element if the attitude of the display control apparatus has been changed from a first attitude to a second attitude that is different from the first attitude by 90 degrees.

* * * * *